United States Patent
Lightfoot et al.

(10) Patent No.: US 10,649,261 B2
(45) Date of Patent: May 12, 2020

(54) LIQUID CRYSTAL EWRITER SYSTEM WITH RESISTIVE DIGITIZER AND HAVING MECHANICAL PALM REJECTION

(71) Applicant: KENT DISPLAYS INC., Kent, OH (US)

(72) Inventors: Mark Lightfoot, Sterling, OH (US); Erica N. Montbach, Kent, OH (US); Duane Marhefka, Winona, OH (US); Asad A. Khan, Kent, OH (US)

(73) Assignee: Kent Displays Inc., Kent, OH (US)

( * ) Notice: Subject to any disclaimer, the term of this patent is extended or adjusted under 35 U.S.C. 154(b) by 133 days.

(21) Appl. No.: 15/665,924

(22) Filed: Aug. 1, 2017

(65) Prior Publication Data

US 2018/0031886 A1    Feb. 1, 2018

Related U.S. Application Data

(60) Provisional application No. 62/369,677, filed on Aug. 1, 2016.

(51) Int. Cl.
*G02F 1/1333* (2006.01)
*G06F 3/041* (2006.01)
(Continued)

(52) U.S. Cl.
CPC ........ *G02F 1/13338* (2013.01); *G02F 1/1334* (2013.01); *G02F 1/13718* (2013.01);
(Continued)

(58) Field of Classification Search
CPC .............. G02F 1/13338; G02F 1/1334; G02F 1/13718; G02F 2202/022; G02F 2202/28;
(Continued)

(56) References Cited

U.S. PATENT DOCUMENTS 5,493,430 A    2/1996 Lu et al.
6,104,448 A    8/2000 Doane et al.
(Continued)

OTHER PUBLICATIONS

Pen Power LCD eWriter System, Jul. 31, 2016.
International Search Report and Written Opinion for PCT/US2017/044898, dated Nov. 15, 2017, 12 pages.

*Primary Examiner* — Charles S Chang
(74) *Attorney, Agent, or Firm* — Serbinowski LLC

(57) ABSTRACT

A liquid crystal eWriter system with a resistive digitizer and having palm rejection includes the following features. An eWriter includes eWriter substrates that are spaced apart from each other, an upper one of the eWriter substrates being formed of a flexible, clear polymeric material and a lower one of the eWriter substrates being formed of a flexible polymeric material. Electrically conductive layers are spaced apart from each other and located between the eWriter substrates. A dispersion layer including a dispersion of cholesteric liquid crystal material and polymer is disposed between the electrically conductive layers. Pressure applied to the eWriter changes a reflectance of the cholesteric liquid crystal material forming an image. A resistive digitizer determines a location of the pressure applied to the eWriter. The system is designed so that the resistive digitizer detects fingernail or stylus input with substantially no lightly written stroke loss but detects substantially no palm input, under ordinary writing conditions.

44 Claims, 14 Drawing Sheets

Figure 2A:
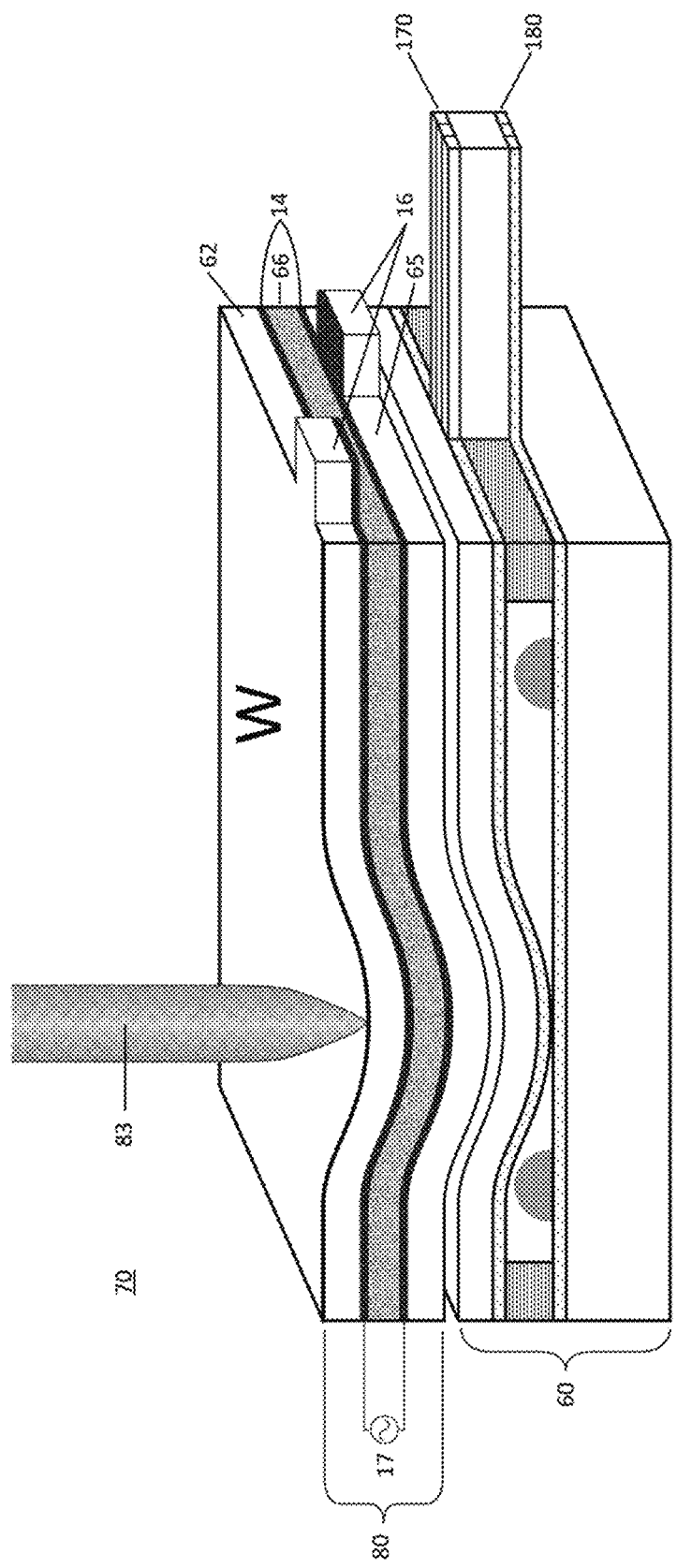

(51) Int. Cl.
*G09G 3/36* (2006.01)
*G02F 1/1334* (2006.01)
*G02F 1/137* (2006.01)
*G06F 3/045* (2006.01)
*G06F 3/14* (2006.01)

(52) U.S. Cl.
CPC ............ *G06F 3/045* (2013.01); *G06F 3/0412* (2013.01); *G06F 3/14* (2013.01); *G09G 3/3651* (2013.01); *G02F 2202/022* (2013.01); *G02F 2202/28* (2013.01); *G02F 2203/02* (2013.01); *G09G 2300/0486* (2013.01); *G09G 2354/00* (2013.01); *G09G 2380/14* (2013.01)

(58) Field of Classification Search
CPC .... G02F 2203/02; G06F 3/045; G06F 3/0412; G06F 3/14; G09G 3/3651; G09G 2354/00; G09G 2300/0486; G09G 2380/14
USPC .......................................................... 349/12
See application file for complete search history.

(56) References Cited

U.S. PATENT DOCUMENTS

| | | | |
|---|---|---|---|
| 8,139,039 | B2 | 3/2012 | Schneider et al. |
| 8,228,301 | B2 | 7/2012 | Schneider |
| 9,116,379 | B2 | 8/2015 | Braganza et al. |
| 9,459,794 | B1* | 10/2016 | Soegiono ............ G06F 3/04883 |
| 2003/0071958 | A1* | 4/2003 | Wu .................. G02F 1/133377 349/156 |
| 2006/0097991 | A1* | 5/2006 | Hotelling .............. G06F 3/0416 345/173 |
| 2006/0279548 | A1* | 12/2006 | Geaghan .............. G06F 3/0416 345/173 |
| 2010/0053095 | A1 | 3/2010 | Wu |
| 2010/0265214 | A1 | 10/2010 | Green et al. |
| 2012/0182238 | A1 | 7/2012 | Lee |
| 2014/0043547 | A1 | 2/2014 | Marhefka |
| 2016/0091745 | A1 | 3/2016 | Braganza et al. |
| 2016/0170505 | A1 | 6/2016 | Jordan |
| 2016/0306483 | A1* | 10/2016 | Files .................... G06F 3/03545 |
| 2017/0153728 | A1* | 6/2017 | Takahashi ............... G06F 3/041 |
| 2017/0153763 | A1* | 6/2017 | Vavra .................... G06F 3/0488 |

* cited by examiner

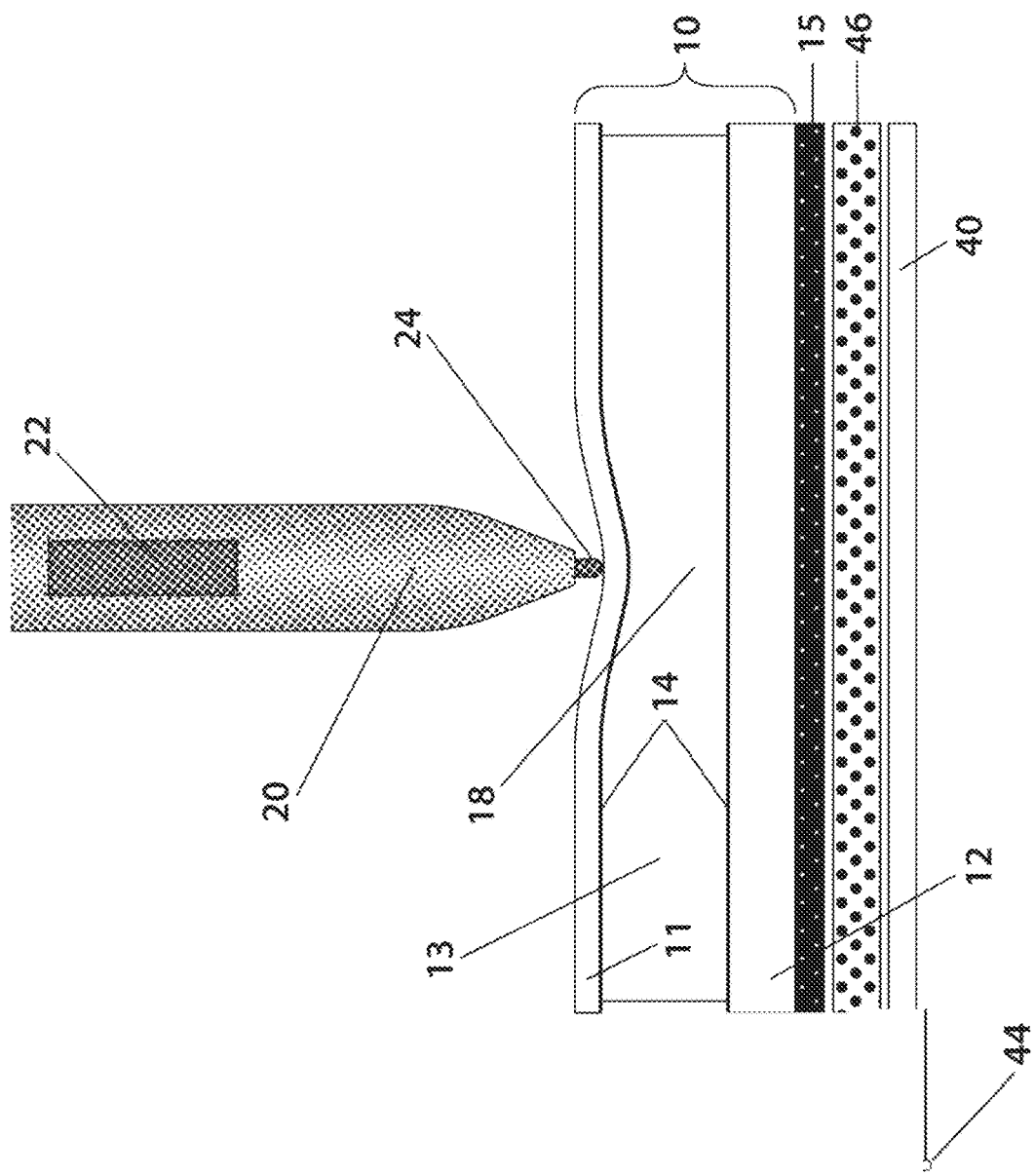

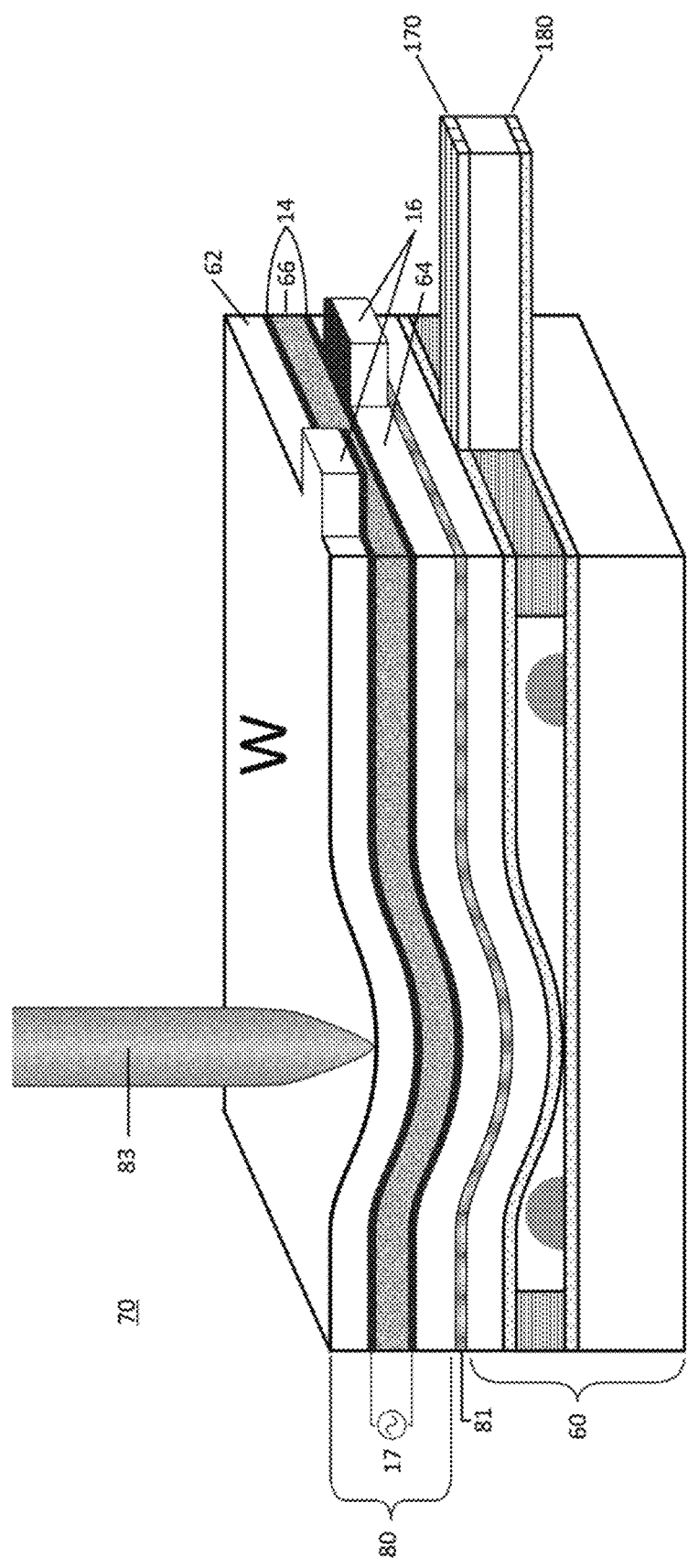

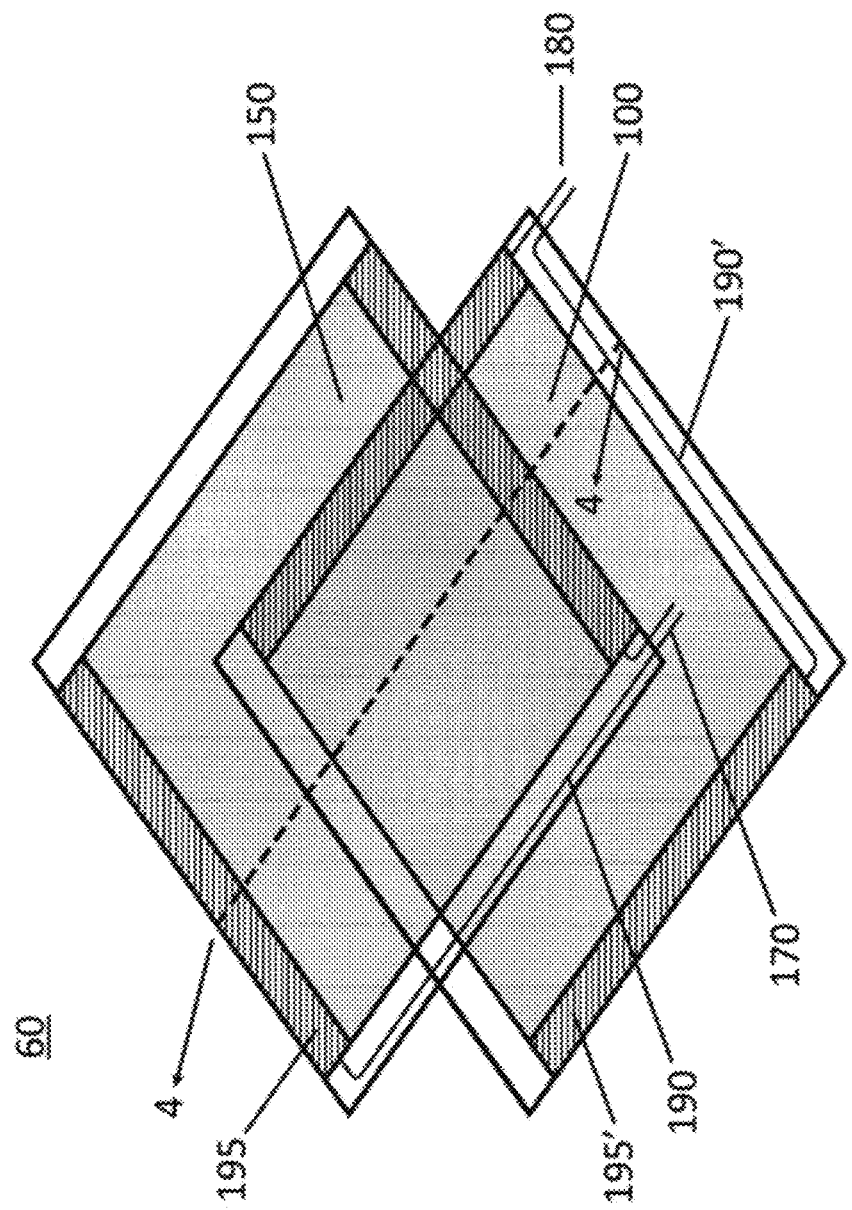

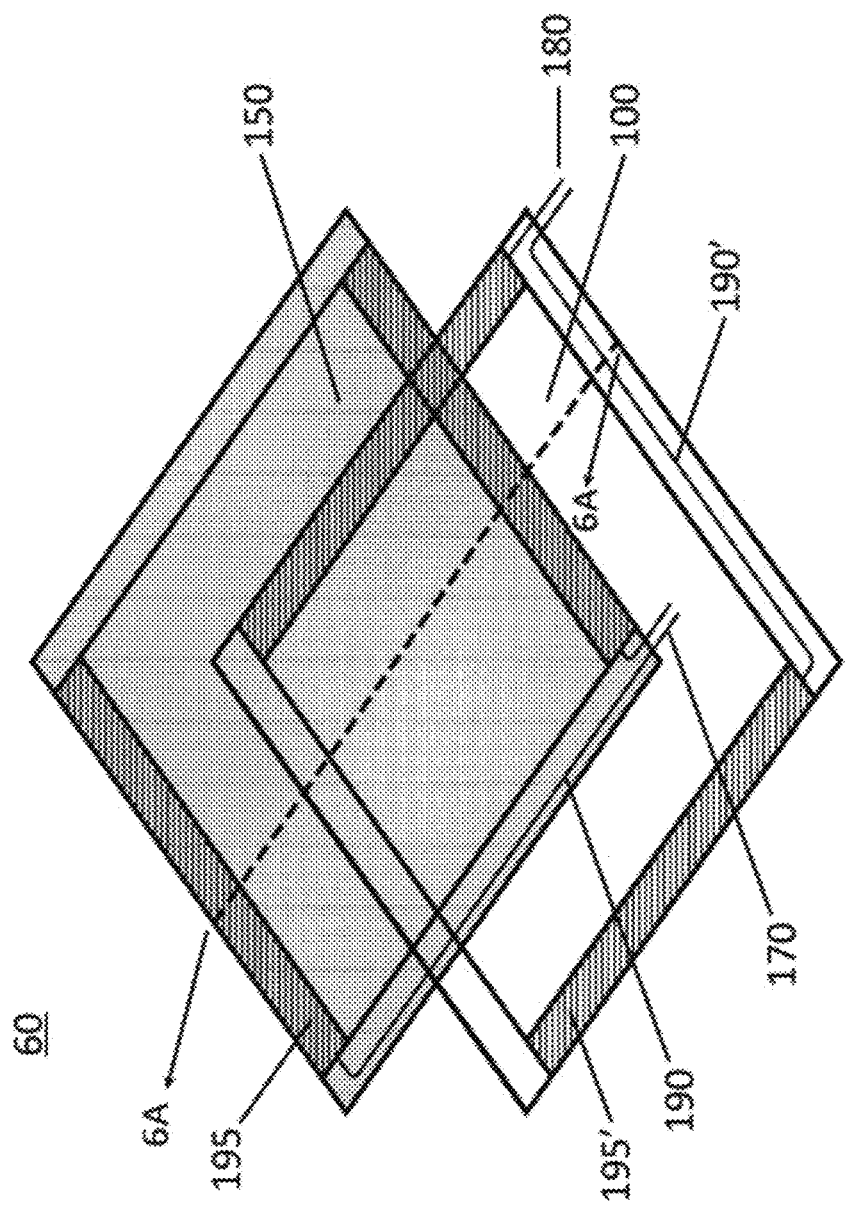

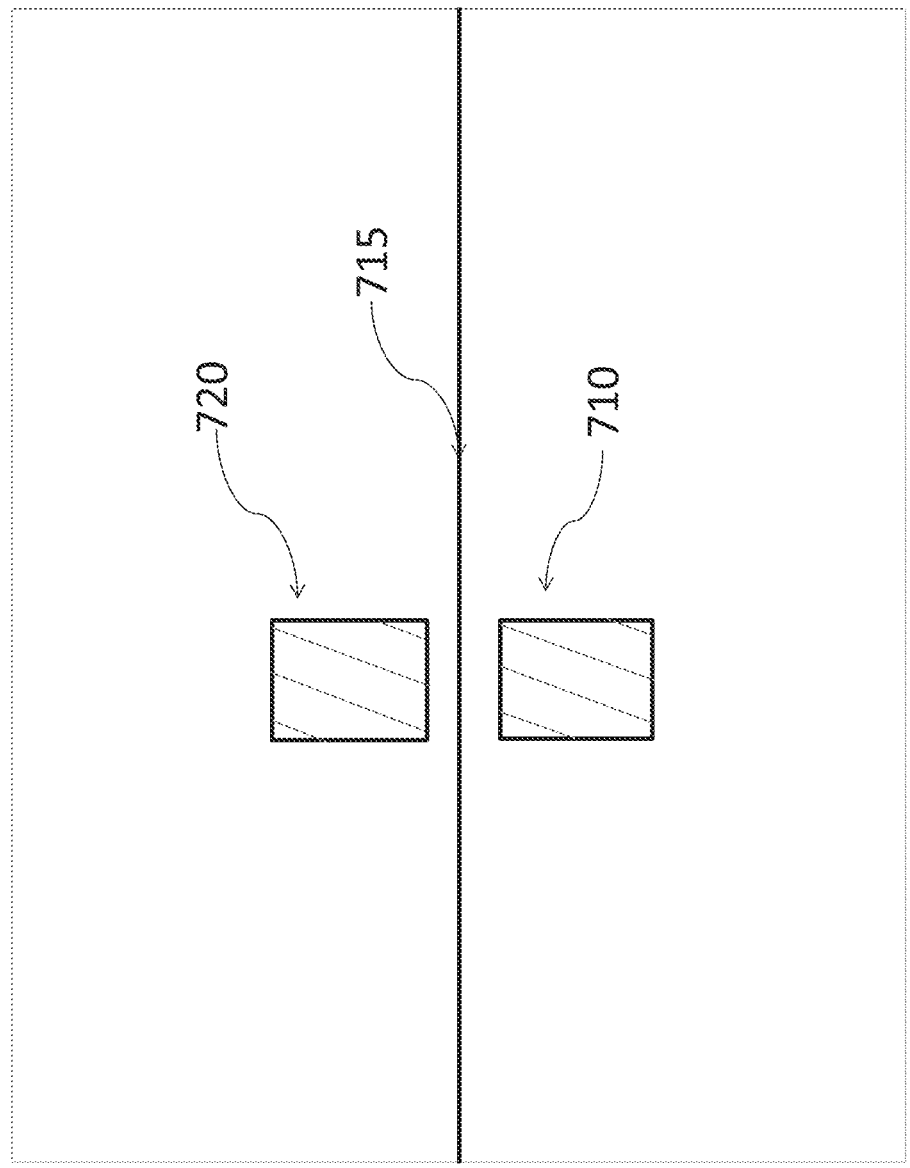

LIQUID CRYSTAL EWRITER SYSTEM WITH RESISTIVE DIGITIZER AND HAVING MECHANICAL PALM REJECTION

TECHNICAL FIELD

This disclosure relates generally to a cholesteric eWriter system, for example, or to what is known as a cholesteric liquid crystal pressure sensitive eWriter.

BACKGROUND OF THE DISCLOSURE

In general, Bistable Liquid Crystal Displays, and in particular, Cholesteric Liquid Crystal Displays (ChLCDs) (employing what is also called chiral nematic liquid crystals), have proven to have great potential to create low cost pressure sensitive eWriters that are efficient power consumers and that can be utilized in a number of unique devices.

Recently, the BOOGIE BOARD® pressure sensitive cholesteric liquid crystal eWriter of Kent Displays Inc. has appeared on the market in which a pointed stylus or the finger can be used to write or trace an image on the surface of the eWriter device as described in U.S. Pat. No. 6,104,448, which is incorporated herein by reference in its entirety. As used in this disclosure, the term eWriter includes any device including substrates and an electrooptical material disposed between the substrates, which exhibits a change in reflectance when writing pressure is applied to one of the substrates, the device being able to be erased upon application of a voltage. This definition of an eWriter excludes devices that are only able to be written on by digitally electrically addressing the liquid crystal as in the case of a laptop that employs a display actively driven with a thin film transistor (TFT) array. The cholesteric liquid crystal eWriter offers a considerable improvement over previous technologies in that the image can be simply and instantly erased with the push of a button that applies a voltage pulse to electrically conductive electrodes in the eWriter.

Both substrates of the cholesteric liquid crystal eWriter are flexible and the bottom substrate is painted with an opaque light absorbing dark background. The upper substrate and upper electrode are optically clear and include electrically conductive layers on their interior surfaces spaced apart by a cell gap. Within the cell gap is a bistable cholesteric liquid crystal which can exhibit two textures, a substantially transparent (focal conic) texture and a color reflective (planar) texture. The spacing of the cell gap is usually set by plastic or glass spacers that are either cylindrical or spherical in shape. The cholesteric liquid crystal eWriter is initialized by applying voltage pulses to the electrodes to electrically drive the cholesteric material to the substantially transparent texture. When one presses on the top substrate with a pointed stylus or finger, the liquid crystal is locally displaced. Flow induced in the liquid crystal changes its optical texture from substantially transparent to a reflective color at the location of the stylus. The reflective color contrasts well with the dark background of the lower substrate. An image traced by the stylus or finger nail will remain on the eWriter device indefinitely without application of a voltage until erased. Erasure is accomplished by applying a voltage pulse to the transparent conducting electrodes on the interior surfaces of the two substrates that drive the cholesteric liquid crystal from its color reflective state back to its substantially transparent state.

The image written on an eWriter is viewable optically but can't be saved utilizing just the eWriter. A digitizer is required either behind or in front of the eWriter for capturing images. This is previously demonstrated in Patent Application Publication 2010/0265214. However, numerous types of digitizers are currently on the market, those that allow for saving from finger or gesture input and those that allow for stylus input. The eWriter device requires a digitizer that utilizes stylus input. Another distinction between different types of digitizers is that the digitizer can either allow input from any stylus or will require input from a dedicated stylus as shown by the commercially available Sync™ eWriter, as disclosed in Patent Application 2014/0043547, which employs an Electromagnetic resonance (EMR) digitizer behind the eWriter. There are many issues with a dedicated stylus including: cost—since miniaturized electronics are required inside the stylus, ease of use—users can only use one stylus that once lost makes the device unusable, and user confusion—the user can still achieve a visually written image on the eWriter when using a different stylus even though the digitizer will not record the written image when the dedicated stylus is not used.

Lower cost digitizers tend to include those of the resistive type. Resistive digitizers have the advantage that they are pressure sensitive and function without the need of a dedicated stylus. Resistive digitizers can be 4 wire, 5 wire, 8 wire, among others. These resistive digitizers can utilize any stylus and do not require a dedicated stylus. Unfortunately, some resistive digitizers do not have palm rejection, meaning if a user puts their palm down while writing the palm will result in a data point. Since these resistive digitizers do not allow for multiple data points the data will be corrupted and result in scribbles across the screen. Therefore, consumers would benefit from an eWriter that can employ a digitizer that allows for stylus writing with palm rejection, that can use any stylus, even a fingernail, and is also low cost.

Other products on the market, such as tablets, use a different type of digitizer called Projected Capacitive (ProCap), where a finely patterned conductive film or films is placed over the top of the display. The ProCap type digitizer works by measuring a capacitance change on the grid of finely patterned conductors when a finger or other item of sufficiently large capacitance comes close to the digitizer. For ProCap digitizers it is possible to have palm rejection programmed into the software. It is not possible with a 4 wire, 5 wire, or 8 wire resistive type digitizer to have palm rejection in the software as multiple touches that register electronically result in corrupted data. Therefore, devices with a ProCap type digitizer are not considered to be relevant to this disclosure.

A problem with the prior art is that the eWriter alone does not digitally save information. If information written on the eWriter needs to be saved, a separate digitizer can be attached to the eWriter to sense and save writing while the eWriter visually displays the writing. In the prior art a separate electromagnetic resonance (EMR) type digitizer is placed below the eWriter, namely, the Boogie Board® Sync™eWriter system. This system has several issues in that it is somewhat expensive and requires a dedicated stylus, meaning only the provided stylus with electronics creates a saved file from the written image. The user could accidentally use a simple plastic stylus and create a visible written note on the Sync™ eWriter system. However, there would not be an electronic image to save due to the wrong stylus being used. Since the sensing and optical response are decoupled, the user does not get the optical feedback seen on a typical display to indicate whether one is using the correct stylus.

Previously designed resistive digitizers have not been commercially used with an eWriter having mechanical palm rejection under ordinary writing conditions. It is not possible to place a typical resistive digitizer behind an eWriter to produce a working system that has both palm rejection and allows for capture of light stylus writing. The typical resistive digitizers would not allow for palm rejection if they would be placed under the eWriter. Since the sensing and optical response are decoupled in a cholesteric eWriter, as previously mentioned, the user would not be able to see in real time what amount of writing pressure needs to be applied to create a defect free saved written image. Consumers would greatly benefit from a low cost eWriter system that has a resistive digitizer and provides palm rejection under ordinary writing conditions, reads lightly written strokes, and can be used with any stylus or even a fingernail.

Currently, commercially available Boogie Board® Sync™ eWriter systems employ an EMR type digitizer, as shown in PRIOR ART FIG. 1. This configuration includes a Typical eWriter 10 that includes a top substrate 11 and a bottom substrate 12. Each substrate has electrodes 14 on the interior surface that are used to electrically drive the Typical eWriter and erase images written on the eWriter. The upper substrate 11 can have additional functional coatings such as anti-glare, anti-fingerprint, hard coat and others. The lower substrate 12 typically has a light absorbing coating 15 that allows for contrast in the written eWriter and prevents visibility of the EMR digitizer underneath the eWriter. Between the electrodes 14 is disposed a dispersion layer 13 including cholesteric liquid crystal (ChLC) and polymer with spacers that allow for images to be written on the eWriter. The top substrate 11 and bottom substrate 12 and their corresponding electrodes 14 go out to eWriter ledges that connect to electronics to switch the eWriter. Under the eWriter is an EMR digitizer 40 that has electrical leads 44 that transmit electrical signals indicating the location of the EMR stylus 20. Between the Typical eWriter 10 and the EMR digitizer is a plastic sheet 46 that is used in the housing of the device. The EMR stylus is relatively complex and costly as it includes electronics on a printed circuit board (PCB) 22. As the EMR stylus 20 is pressed into the eWriter 10 the upper substrate 11 depresses 18 and allows for a bright written line to appear on the eWriter. In addition to writing on the eWriter, the upper substrate 11 depression 18 triggers a spring in the tip 24 of the EMR stylus 20 causing written data to be recorded by the EMR digitizer 40. Only when using the EMR stylus 20 will writing/drawing information be tracked and recorded by the eWriter/EMR digitizer system. The Typical eWriter itself will respond to any written pressure from any simple plastic stylus or even a fingernail. All that is required to make an image is to apply localized pressure to the eWriter. Therefore, with the Typical eWriter/EMR system users have the possibility of seeing a written image on the Typical eWriter when a non-EMR stylus is used, but in that case no data is recorded by the EMR digitizer and the image is not saved.

SUMMARY OF THE DISCLOSURE

Disclosed here is a liquid crystal eWriter system including an Advanced resistive Digitizer that allows for writing and recording images using a non-specialized stylus while rejecting writing from a palm resting on the writing surface of the eWriter system. In addition, the liquid crystal eWriter system allows for writing and recording images using any other object, even a fingernail. The design of the eWriter system allows one to record only the desired stylus data stream without corrupting the data with palm pressure or losing lightly written data. The terms "palm rejection" and "mechanical palm rejection" are used synonymously in connection with the eWriter of this disclosure. The eWriter system includes an Advanced eWriter and an Advanced resistive Digitizer that physically cooperate to achieve use of a stylus with substantially no light stroke loss and mechanical palm rejection, due to the size and distribution of printed electronics features along with the display physical construction. Software is not needed to achieve palm rejection in the present eWriter system. Nor is there an electrical coordination, feedback or cooperation between the Advanced eWriter and the Advanced resistive Digitizer to bring about palm rejection or capture of light strokes. For example, no charge is imparted by a stylus through the liquid crystal that is used for the digitizer's operation. The digitizer is not needed to form an image on the eWriter (e.g., an active matrix of TFTs is not needed to address the liquid crystal material). In addition, the Advanced resistive Digitizer is a fully printed device using low cost conductors such as PEDOT/PSS, silver, dielectric, and carbon. In view of the above, the liquid crystal eWriter system with Advanced resistive Digitizer of this disclosure is low cost, easy to manufacture, reliable and exhibits high performance.

A first particular embodiment of the eWriter system including the Advanced resistive Digitizer having mechanical palm rejection places the Advanced eWriter above the Advanced resistive Digitizer (the resistive digitizer is disposed more distal from the user than said eWriter is from the user). The Advanced eWriter provides instant "analogue" visual feedback when pressure is applied to the writing surface, without the need for an active matrix of thin film transistors for forming a digital image on the Advanced eWriter. The image is very clear with good contrast and there is no upper digitizer or other component over the Advanced eWriter that interferes with image quality. The Advanced resistive Digitizer allows for images to be electronically saved in the eWriter system. The Advanced resistive Digitizer is designed specifically to work below the layers of the Advanced eWriter in this embodiment and to record written data with any stylus. The Advanced resistive Digitizer has palm rejection and it responds to light writing such that there is no lightly written stroke loss. The eWriter system has been designed so that the Advanced resistive Digitizer can use non-dedicated stylus input while rejecting data input from the palm of a resting hand. The eWriter system including the Advanced resistive Digitizer can be very low cost because expensive miniaturized electronics are not required in the stylus and the Advanced resistive Digitizer can be created from printed electronics in a low cost fashion. The Advanced eWriter is designed to be placed above the Advanced resistive Digitizer such that the thickness of the eWriter is thin enough to transmit the written pressure of the stylus without causing damage to the display materials.

A second particular embodiment places an Advanced eWriter more distal from the user than an Advanced resistive Digitizer is from the user (Advanced resistive Digitizer on top). While the present disclosure focuses on the first particular embodiment due to certain advantages, including a better image on the eWriter when the Advanced resistive Digitizer is below the Advanced eWriter, one of ordinary skill in the art could make and use the design of this embodiment in reading this disclosure with appropriate modifications. It will be appreciated that when the Advanced eWriter is on the bottom of the liquid crystal eWriter system, the writing surface of the system is on the Advanced resistive Digitizer.

A first aspect of the disclosure is directed to a liquid crystal eWriter system with a resistive Digitizer and having mechanical palm rejection including the following features. An eWriter is one component of the eWriter system and is also referred to as an Advanced eWriter to distinguish from the Typical eWriter. The eWriter (e.g., Advanced eWriter) includes eWriter substrates that are spaced apart from each other, an upper one of the eWriter substrates being formed of a flexible, optically clear polymeric material and a lower one of the eWriter substrates being formed of a flexible polymeric material. Electrically conductive layers are spaced apart from each other and located between the eWriter substrates. A dispersion layer including a dispersion of cholesteric liquid crystal material and polymer is disposed between the electrically conductive layers. Pressure applied to the eWriter changes a reflectance of the cholesteric liquid crystal material forming an image. A resistive digitizer (e.g., Advanced resistive Digitizer) determines a location of the pressure applied to the eWriter. The Advanced resistive Digitizer detects fingernail or stylus input with substantially no lightly written stroke loss but detects substantially no palm input, under ordinary writing conditions.

Reference in this disclosure to "ordinary writing conditions" is taken to mean the palm force applied when one writes on paper with a pen while resting a palm on the paper placed on a hard supporting surface (e.g., a table or desk) so as to fill a page with writing or drawing (e.g., as opposed to a single line or mark, or small number of lines or marks). As used herein the term "writing" is interpreted to cover both writing (e.g., printing and handwriting) and drawing (e.g., tracing, sketching, doodling, making artwork and the like). While the force applied by the palm will differ with each user even under ordinary writing conditions, the force applied by the palm "under ordinary writing conditions" as these terms are used in this disclosure will clearly exclude certain palm forces, for example, when one writes without resting the palm at all on the eWriter device and when one writes while resting a palm extremely lightly on the eWriter. As the eWriter is a paper replacement, these ordinary writing conditions with regard to palm force that is applied by a pen on paper are useful to understand conditions when writing on the eWriter with a stylus or fingernail. "Ordinary writing conditions" are similar to "typical writing practices" as used in this disclosure and differ in that the latter was quantified.

Reference in this disclosure to "lightly written strokes" refers to a minimum force applied to a stylus while writing under "ordinary writing conditions" as defined above, that is just able to produce an image on the eWriter. The terms "lightly written strokes" do not apply to unusually light and thin writing. The terms "substantially no lightly written stroke loss" as used in this disclosure means that the resistive digitizer will capture all or substantially all of the lightly written strokes.

The terms "minimum Stylus Activation Force" and a "Palm Activation Force" providing palm rejection, are defined in this disclosure and given example values. The minimum Stylus Activation Force is less than the Palm Activation Force. It will be understood by one of ordinary skill in the art in reading this disclosure that the features of the resistive digitizer detecting substantially no palm input "under ordinary writing conditions" in this disclosure, may result in values that differ from the example values of minimum Stylus Activation Force and Palm Activation Force, and also may include some or all of the example values provided in this disclosure. Although having no palm input even when larger palm forces are applied is an excellent condition, one of ordinary skill in the art in reading this disclosure will recognize that balance is needed in the eWriter system design so that the eWriter also records lightly written strokes by a fingernail or stylus. Similarly, an eWriter system does not fall within the scope of the present disclosure if one needs to write on it in unusual ways to avoid palm input, such as by not resting the palm at all on the device, or very lightly resting the palm on the device.

Reference herein to "a user" is taken to mean a person who is applying a fingernail or stylus to the eWriter. While one could look at the eWriter on one side and write on the other, for the sake of understanding and not intending to limit the scope of the claimed invention, this vantage point referring to "the user" is meant to be where the user looks and writes on the same side of the eWriter.

It should be appreciated that terms such as upper, lower, front, back, top, bottom and the like are merely for improving understanding and should not be used to limit the invention as defined by the claims, since the eWriter system may be used in different orientations.

The following refers to specific features of the first aspect of the disclosure which can be applied, along with all features of the Detailed Description, in any combination. One feature is that electronic circuitry can apply a voltage to the electrically conductive layers that erases the image.

Another feature is that the Advanced resistive Digitizer includes digitizer substrates that are spaced apart and polymeric spacers between the digitizer substrates. The construction and arrangement of the liquid crystal eWriter system includes design parameters selected from the group consisting of: a thickness of the upper eWriter substrate, a thickness of the lower eWriter substrate, a thickness of an upper digitizer substrate, a spacing between the digitizer spacers, a size of the digitizer spacers, a height of the digitizer spacers, and combinations thereof, that are tailored to enable the Advanced resistive Digitizer to detect the fingernail or stylus input with substantially no lightly written stroke loss but to detect substantially no palm input, under ordinary writing conditions.

Other features are that a combined thickness of the upper eWriter substrate and the thickness of the lower eWriter substrate ranges from 2-9 mils. Still further, the thickness of the upper digitizer substrate ranges from ½-3 mils. In another feature, the spacing between the digitizer spacers ranges from 0.2-0.9 mm. In particular, another set of features is that a combined thickness of the upper eWriter substrate and the thickness of the lower eWriter substrate ranges from 2-9 mils; the thickness of the upper digitizer substrate ranges from ½-3 mil and the spacing between the digitizer spacers ranges from 0.2-0.9 mm.

A second aspect of the disclosure is directed to a liquid crystal eWriter system with a resistive digitizer and having mechanical palm rejection including the following features. An eWriter (i.e., also referred to as the Advanced eWriter) includes a writing surface. eWriter substrates are spaced apart from each other, an upper one of the eWriter substrates being formed of a flexible, optically clear polymeric material and a lower one of the eWriter substrates being formed of a flexible polymeric material. Electrically conductive layers are spaced apart from each other and located between the eWriter substrates. A dispersion layer including a dispersion of cholesteric liquid crystal material and polymer is disposed between the electrically conductive layers. Pressure applied to the writing surface by a user changes a reflectance of the cholesteric liquid crystal material forming an image. A resistive digitizer (e.g., Advanced resistive Digitizer) is positioned below the Advanced eWriter (i.e., disposed more distal from the user than the eWriter is from the user), wherein the resistive digitizer determines a location of the pressure applied to the writing surface. The liquid crystal eWriter system includes a minimum Stylus Activation Force in the range of 0.02N to 0.4N and a Palm Activation Force that is ≥2.5N providing palm rejection.

All of the specific features discussed in connection with the first aspect, as well as all features of the Detailed Description, may be applied to the second aspect in any combination. Specific features of the second aspect are described below.

One specific feature of the second aspect is that the Advanced resistive Digitizer can include digitizer substrates that are spaced apart from each other and digitizer spacers between the digitizer substrates. The construction and arrangement of the liquid crystal eWriter system can include design parameters selected from the group consisting of: a thickness of the upper eWriter substrate, a thickness of the lower eWriter substrate, a thickness of an upper digitizer substrate, a spacing between the digitizer spacers, a size of the digitizer spacers, a height of the digitizer spacers, and combinations thereof, that are tailored to enable the Advanced resistive Digitizer to achieve the Stylus Activation Force and the Palm Activation Force.

Other specific features are that the Palm Activation Force is in the range of 2.5N to 4N or the Palm Activation Force is ≥4N.

Yet another specific feature of the second aspect of the disclosure is a light absorbing back layer disposed below a lower one of the electrically conductive layers. The light absorbing back layer is adapted to absorb light that passes through the dispersion layer.

Still further, the lower eWriter substrate can be a light absorbing layer and is disposed below a lower one of the electrically conductive layers. The lower eWriter substrate includes pigment dispersed inside adapted to absorb light that passes through the liquid crystal. The lower eWriter substrate that includes pigment or a light absorbing layer can be black or other colors. Using a color light absorbing layer is disclosed in U.S. Pat. No. 5,493,430.

Another feature is a semitransparent back layer disposed below a lower one of the electrically conductive layers. The semitransparent back layer absorbs light that passes through the dispersion layer, reflects grey light or light of a color and is light transmitting. The lower eWriter substrate can be the semitransparent back layer or another layer below the eWriter substrate can be the semitransparent back layer.

Yet another feature of the disclosure is an optically clear eWriter system having features of the first or second aspects of the eWriter systems described above, except including a semitransparent back layer instead of an opaque light absorbing layer, and including optically clear components. Components being optically clear, can include the eWriter substrates, any coatings on the upper eWriter substrate, the dispersion layer, the eWriter electrodes, any coupling layer between the Advanced eWriter and the Advanced resistive Digitizer, the upper and lower substrates of the resistive Digitizer, the sensing electrodes of the resistive Digitizer, the conductive traces of the resistive Digitizer, and spacers of the resistive Digitizer. In a particular feature, all components of the optically clear eWriter system in a projected region orthogonal to and encompassing the writing surface are optically clear except for the semitransparent back layer, which permits use of a frame or bezel for rigidizing the eWriter system that can be clear or opaque.

In the case of the optically clear eWriter system, a back pattern can be disposed at a back of the eWriter system below the Advanced resistive Digitizer and below the semitransparent back layer. The back pattern is viewable through the writing surface or, in other words, completely through the eWriter system. This back pattern can be a fixed item or object on which the eWriter system is placed or it can be formed by a removable item placed or affixed on or adjacent to the eWriter system. A removable back pattern is selected from the group consisting of a template of a sports field, court or arena, a pattern for a children's game, an image for children to color, notepad lines, graph paper lines, or a menu of items that one can choose from. The back pattern can be formed by the following: ink printed on paper or on a polymeric substrate forming coloring paper, tracing paper, lined writing paper or graph paper; by a liquid crystal display; by a waveguide and the like, as disclosed in U.S. Pat. No. 9,116,379, which is incorporated herein by reference in its entirety. This optically clear eWriter system can capture images written on the Advanced eWriter while enabling objects and back patterns to be viewed completely through the eWriter system, which was not possible with the Typical eWriter having an EMR digitizer, since it was not optically clear. For example, the optically clear eWriter system can include a lined template at a bottom of the system supported by a hard surface so that one writes on the writing surface while being guided by the lines of the template. Also, a child can use the eWriter system as a toy by placing a coloring or tracing layer or template at a bottom of the system supported by a hard surface so that the child can trace on the eWriter the lines of the template or color in a picture outlined on the coloring template. For the first time, the optically clear eWriter system will save the images that are drawn, written and "colored" in, while using the back pattern, and this will be achieved without any specialized stylus being required.

A third aspect of the present disclosure features a liquid crystal eWriter system with a resistive Digitizer and having mechanical palm rejection, including the following features. A battery powers the liquid crystal eWriter system. A memory storage device is included in the liquid crystal eWriter system. Also a component of the eWriter system is an eWriter (e.g., Advanced eWriter) which includes: a writing surface, eWriter substrates spaced apart from each other, an upper one of the eWriter substrates being formed of a flexible, optically clear polymeric material and a lower one of the eWriter substrates being formed of a flexible, polymeric material, electrically conductive layers spaced apart from each other and located between the eWriter substrates, a dispersion layer including a dispersion of cholesteric liquid crystal material and polymer disposed between the electrically conductive layers, wherein pressure applied to the writing surface by a user changes a reflectance of the cholesteric liquid crystal material forming an image. Another component of the eWriter system is a resistive digitizer (e.g., Advanced resistive Digitizer) disposed below the eWriter (i.e., more distal from the user than the eWriter is from the user), wherein the resistive digitizer determines a location of the pressure applied to the writing surface. Further, a processor is configured to execute software for converting the location of the pressure applied to the writing surface into image data and for storing the image data in the memory storage device. The liquid crystal eWriter system includes a Stylus Activation Force in the range of 0.02N to 0.4N and a Palm Activation Force that is ≥2.5N providing palm rejection.

All specific features discussed above in connection with the first and second aspects of the disclosure, as well as all features of the Detailed Description, apply to this third aspect of the disclosure in any combination.

One specific feature of the third aspect is a data interface adapted to connect the liquid crystal eWriter system to an external device and also adapted to transmit the image data stored in the memory storage device to the external device for reproducing on the external device the image formed on the eWriter. Suitable external devices include PCs, laptops, cell phones, tablet computers, PDAs and the like.

A fourth aspect of the disclosure features a liquid crystal eWriter system with a resistive Digitizer and having palm rejection and the capability for streaming data, which is the same as the third aspect except for the following differences. The resistive digitizer is disposed more distal from the user than the eWriter is from the user, wherein the resistive digitizer determines a location of the pressure applied to the writing surface. A data interface is adapted to connect the liquid crystal eWriter system to an external device and also adapted to transmit data to the external device. A processor is configured to execute software for converting the location of the pressure applied to the writing surface into coordinate data and to stream the coordinate data over the data interface to the external device in real time or near real time for reproducing on the external device the image formed on the eWriter. A memory storage device need not be included in the eWriter system. For example, the processor has limited memory resources for buffering coordinate data from the resistive touch controller and must transmit coordinate data to the external device over the wired or wireless data connection in real-time or near real-time in order to prevent data loss.

Any of the specific features discussed in connection with the first through third aspects can be used in this fourth aspect, as well as all features of the Detailed Description, in any combination.

Regarding further specific features possible in various aspects and embodiments above, the total substrate thickness of the Advanced eWriter may be thinner than in a Typical eWriter, and can be not more than 8 mils, for example.

The eWriter system may include a coupling layer comprising adhesive disposed between the eWriter and the resistive digitizer. In particular, the adhesive includes at least one of pressure sensitive adhesive, liquid adhesive or spray adhesive.

In addition, the top substrate of the Advanced resistive Digitizer is thinner than commercially available resistive digitizers. The top substrate of commercially available resistive digitizers tend to be typically from 4 mil to 8 mil thick. The thicker top substrate protects the conductive layers of the digitizer from damage upon flexing of the digitizer's top substrate. When the eWriter is above the digitizer this allows for thinner digitizer top substrates without concern that the digitizer conductive layers will be damaged, as the eWriter adds thickness above the digitizer top substrate. For this disclosure the digitizer top substrate can be thinner, for example, from 0.5 mil to 4 mil, to allow for palm rejection and substantially no stroke loss when the eWriter is above the digitizer.

Further features described in the Detailed Description below may be applied to all aspects of the disclosure, including to the specific features, described above in any combination.

BRIEF DESCRIPTIONS OF DRAWINGS

FIG. 1: A side view of a Prior Art eWriter with an EMR digitizer and dedicated EMR stylus containing a PCB.

FIG. 2A: A perspective view showing a liquid crystal eWriter system with Advanced resistive Digitizer of this disclosure.

Figure 2B:
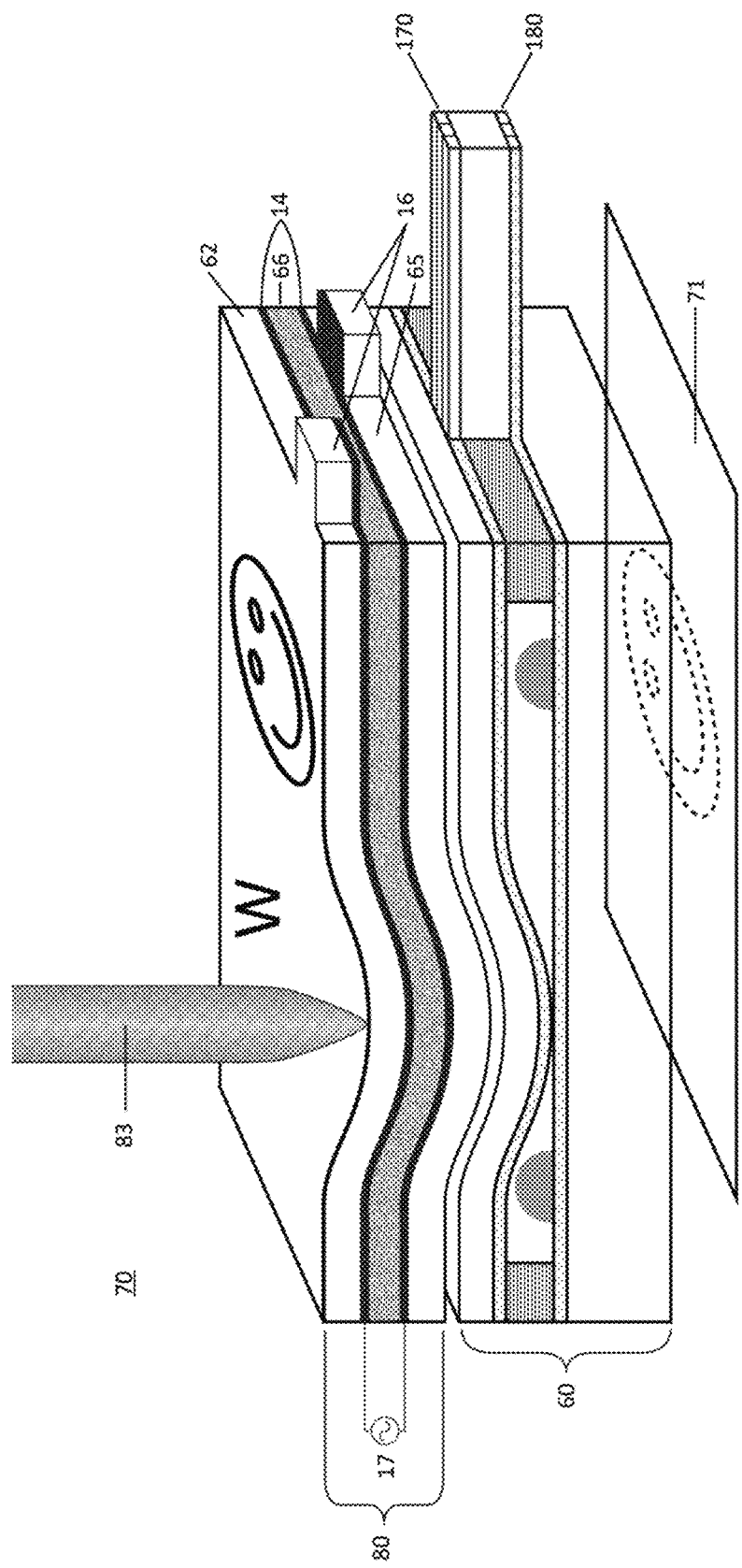

FIG. 2B: A perspective view showing a liquid crystal eWriter system with Advanced resistive Digitizer of this disclosure, where the eWriter bottom substrate is semi-transparent and allows for the use of the liquid crystal eWriter system in transparent mode.

FIG. 3: A perspective view showing a liquid crystal eWriter system with Advanced resistive Digitizer of this disclosure with an alternative construction with pressure sensitive adhesive (PSA) connecting the Advanced eWriter to the Advanced resistive Digitizer.

Figure 4:
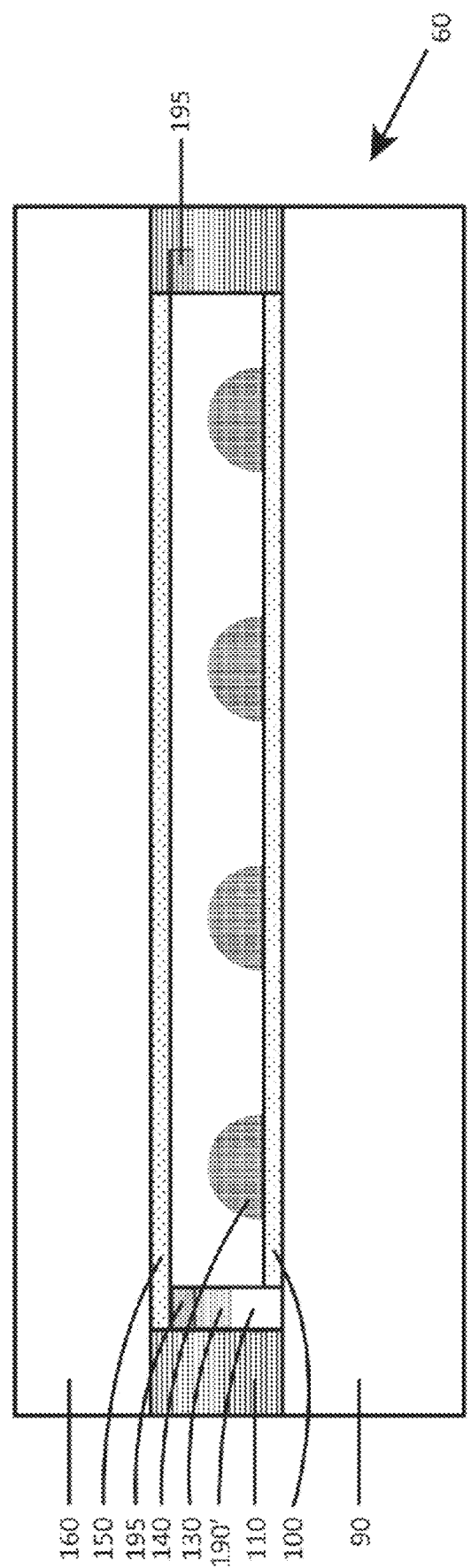

FIG. 4: A side view showing an Advanced resistive Digitizer used in the eWriter system of this disclosure. This Advanced resistive Digitizer is a 4-wire Advanced resistive Digitizer where the top sensing electrode and bottom sensing electrode are patterned.

FIG. 5: A top perspective view showing an Advanced resistive Digitizer used in the eWriter system of this disclosure. This Advanced resistive Digitizer is a 4-wire resistive digitizer where the top sensing electrode and bottom sensing electrode are patterned.

Figure 6A:
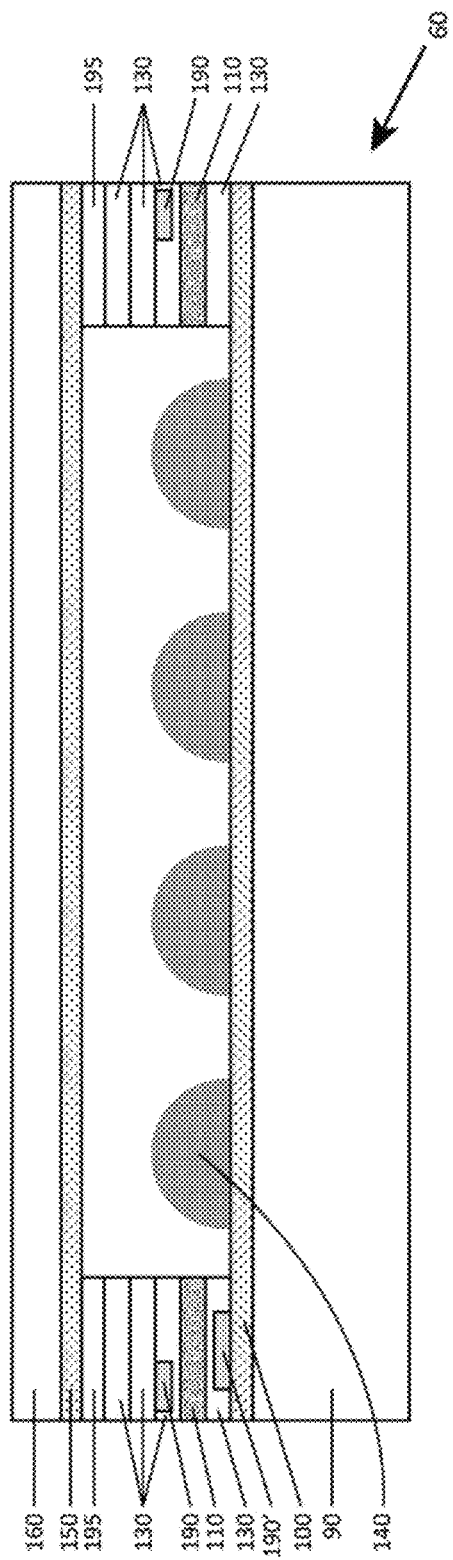

FIG. 6A: A side view showing an Advanced resistive Digitizer used in the eWriter system of this disclosure. This resistive Digitizer is a 4-wire resistive digitizer where the top sensing electrode and bottom sensing electrode are continuous and unpatterned.

FIG. 6B: A top perspective view showing an Advanced resistive Digitizer used in the eWriter system of this disclosure. This Advanced resistive Digitizer is a 4-wire resistive digitizer where the top sensing electrode and bottom sensing electrode are unpatterned.

Figure 7:
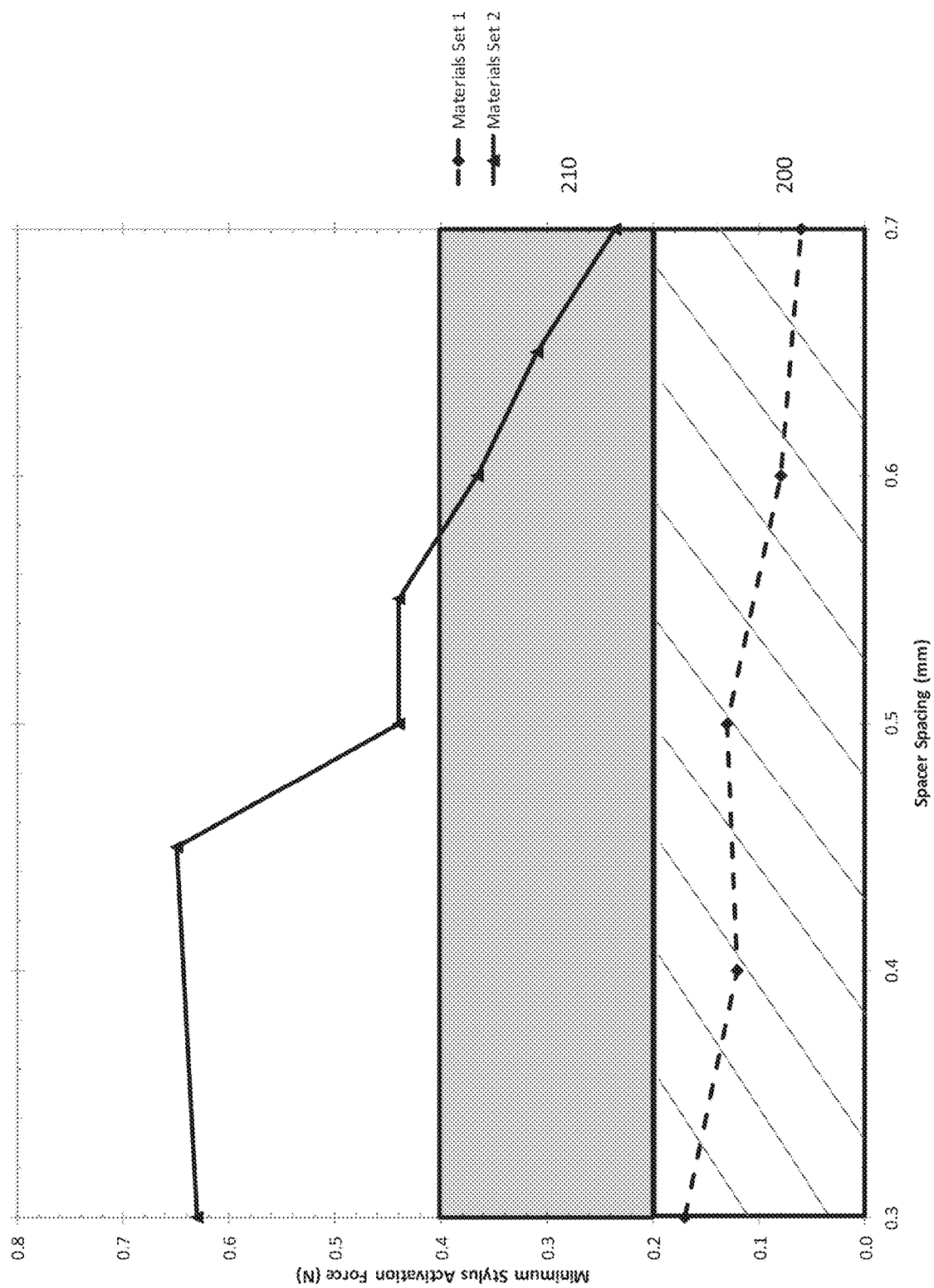

FIG. 7: This is a graph showing Minimum Stylus Activation Force versus digitizer spacer distance for two liquid crystal eWriter system sets of this disclosure.

Figure 8:
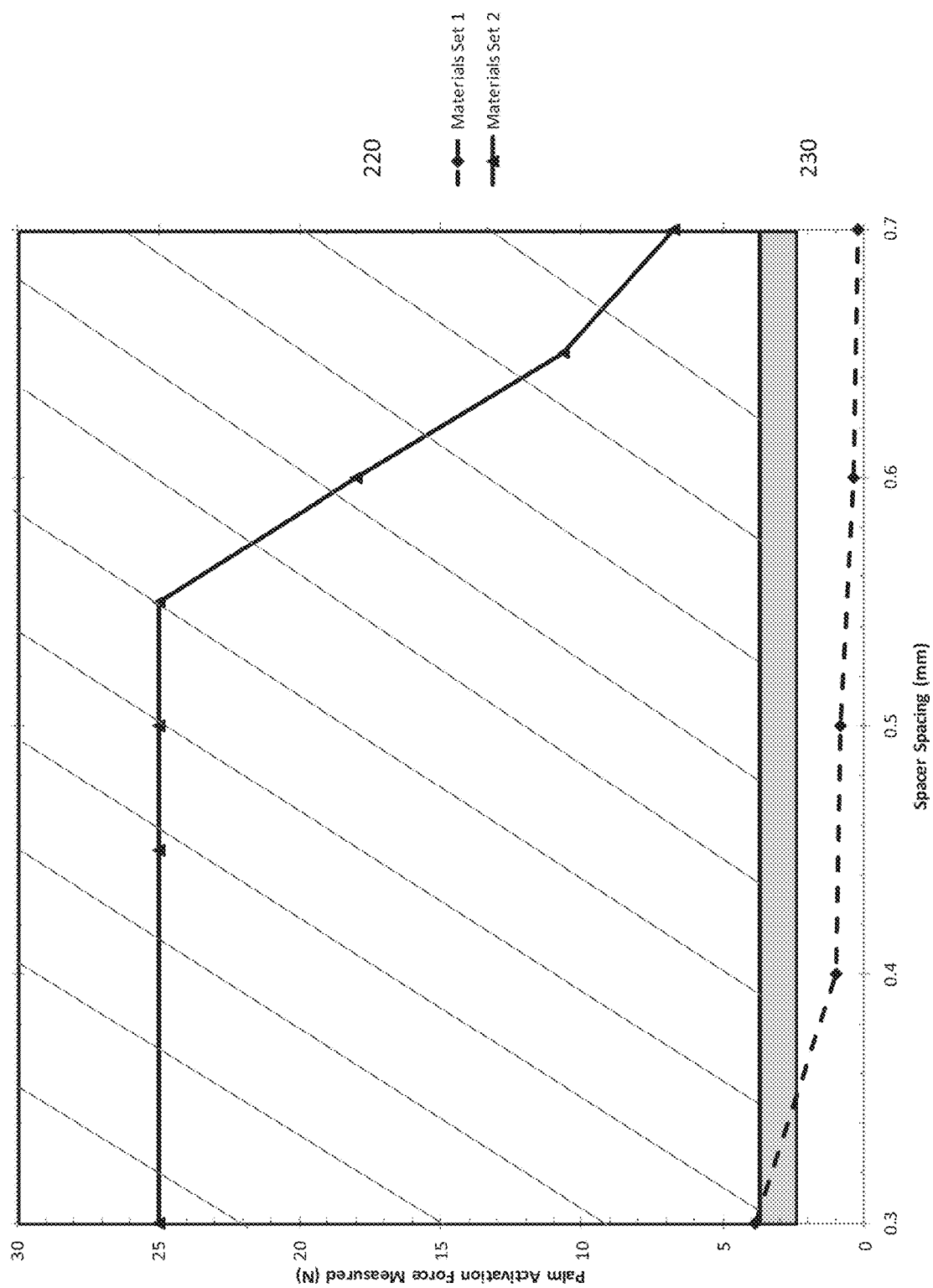

FIG. 8: This is a graph showing Palm Activation Force versus digitizer spacer distance for the two liquid crystal eWriter system sets of this disclosure that were used in FIG. 7.

Figure 9:
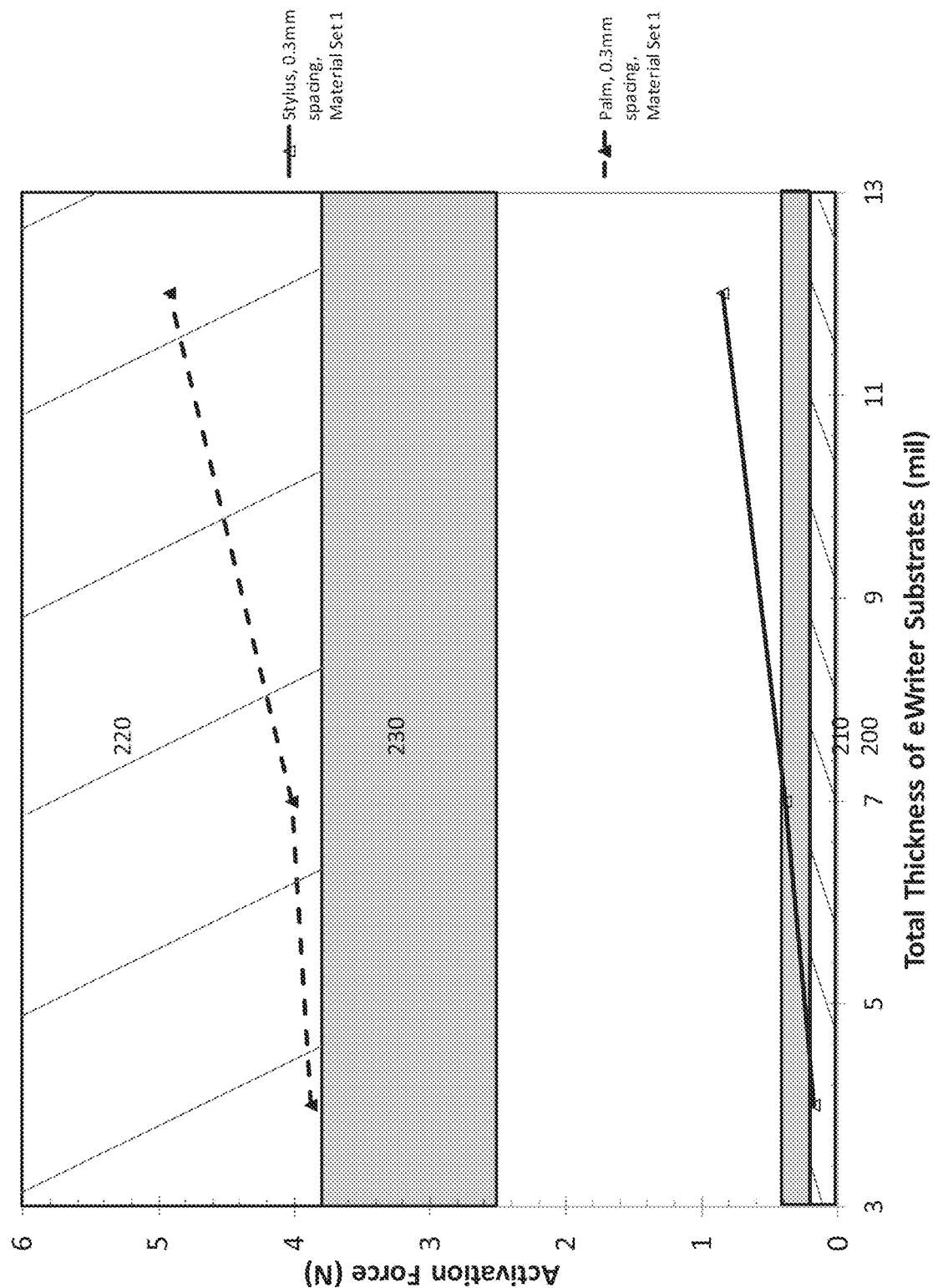

FIG. 9: This is a graph of measured minimum stylus activation force and measured palm activation force versus total thickness of eWriter substrates for a liquid crystal eWriter system.

Figure 10:
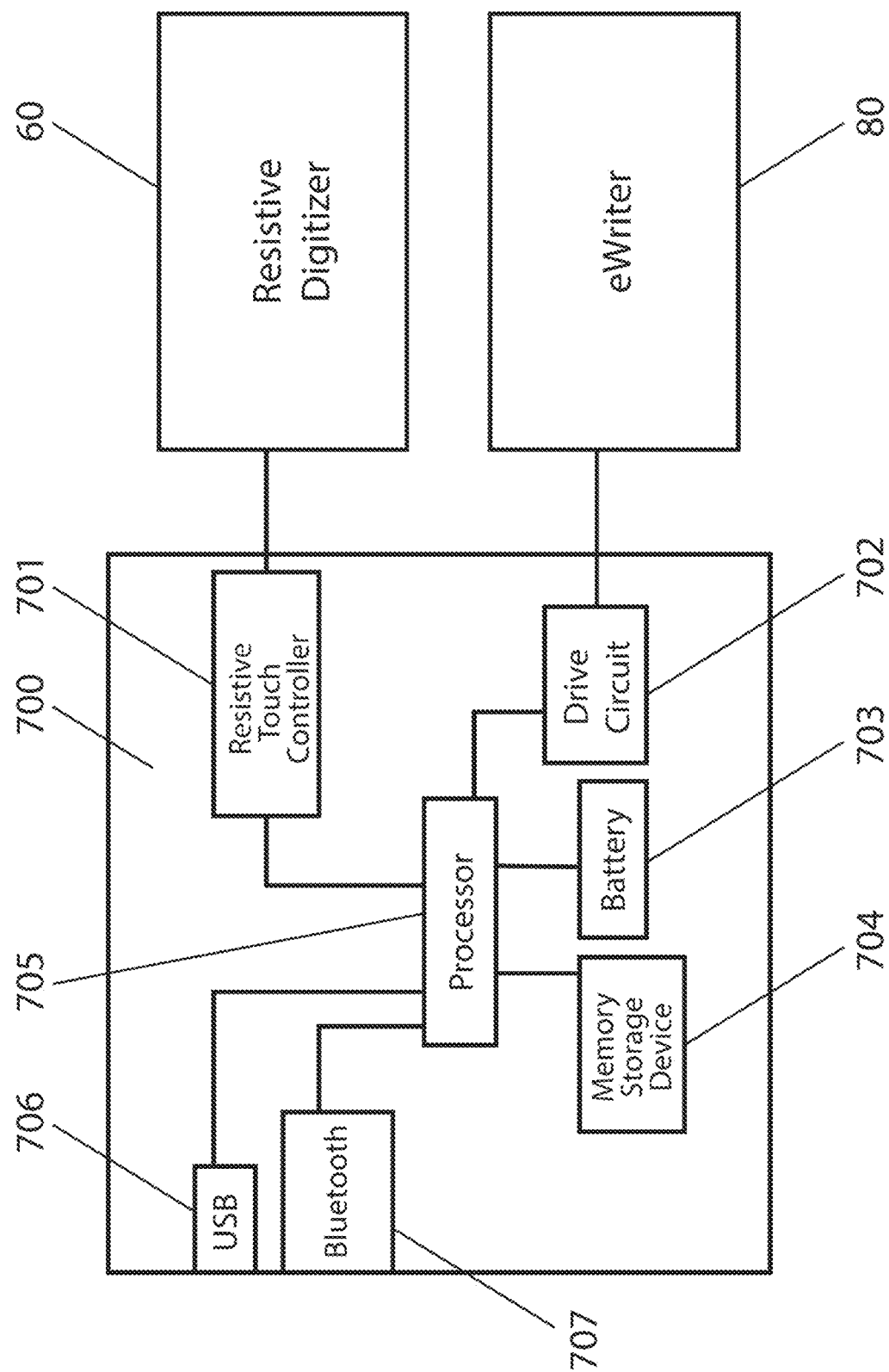

FIG. 10: A block diagram showing the electrical components of a liquid crystal eWriter system with Advanced resistive Digitizer of this disclosure.

Figure 11:
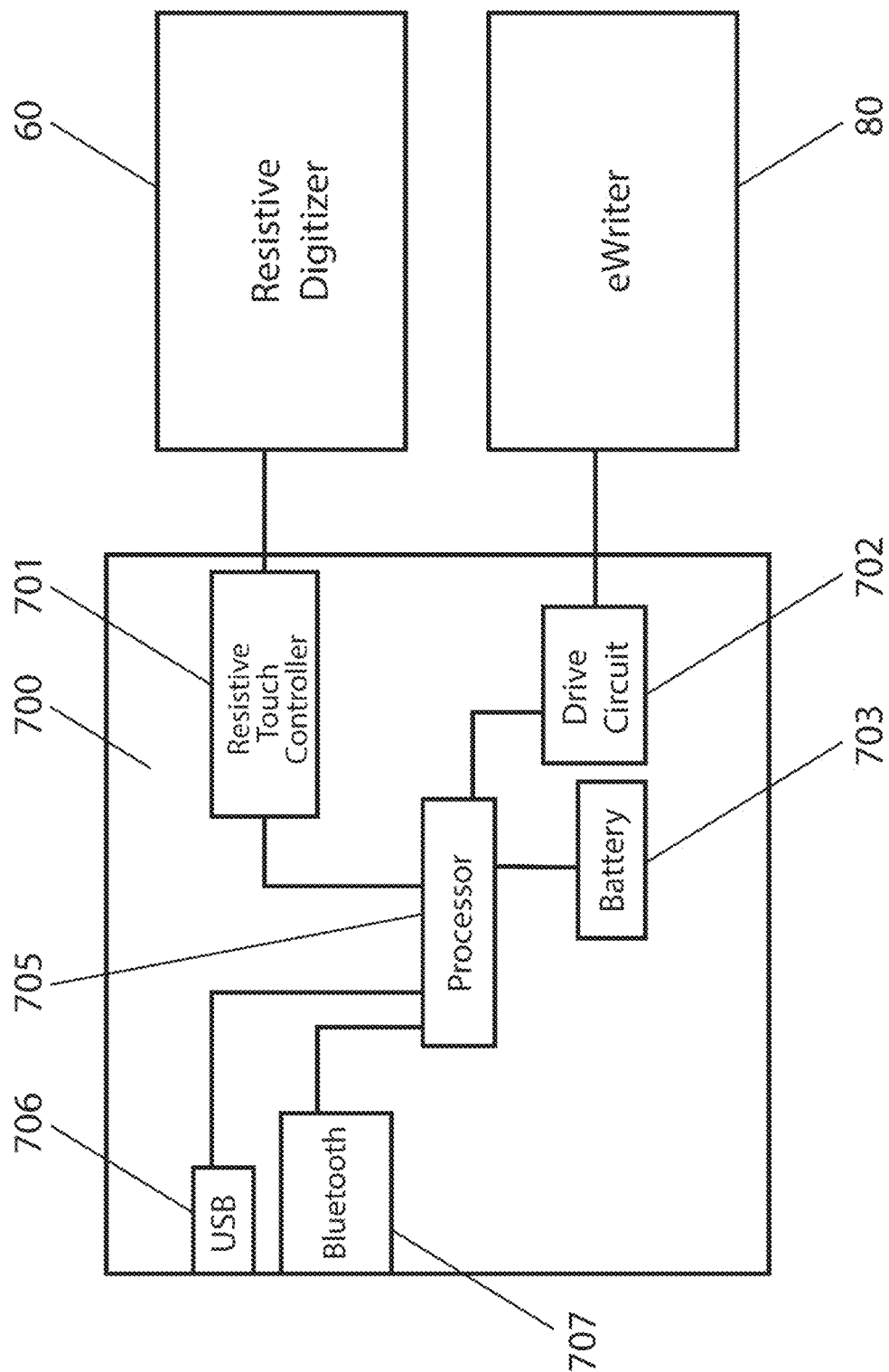

FIG. 11: A block diagram showing the electrical components of a liquid crystal eWriter system with Advanced resistive Digitizer of this disclosure, where the device is in streaming mode.

FIG. 12: The concept of a liquid crystal eWriter system with Advanced resistive Digitizer and having palm rejection of this disclosure is illustrated.

DETAILED DESCRIPTION

Turning now to FIG. 2A the Advanced resistive Digitizer 60 is disposed underneath the Advanced eWriter 80 in the liquid crystal eWriter system 70. The Advanced eWriter 80 is different from the Typical eWriter 10 of PRIOR ART FIG. 1, in that it is designed to cooperate with an Advanced resistive Digitizer to provide palm rejection. The Advanced eWriter 80 includes a thin, optically clear and flexible upper eWriter substrate 62 and a thin flexible lower eWriter substrate 65, which can be optically clear, semitransparent or opaque. Each eWriter substrate has electrically conductive layers or electrodes 14 formed on the interior surface of the substrate that are used to electrically drive the Advanced eWriter and erase images written on the eWriter. At least the upper electrode 14 is optically clear. The top eWriter substrate 62 and bottom eWriter substrate 65 and their corresponding electrodes 14 go out to eWriter ledges 16 that connect to electronics generally represented by 17 to drive or erase images on the eWriter. The thin upper eWriter substrate 62 can have additional functional coatings such as anti-glare, anti-fingerprint, hard coat and others, for example, applied on an exterior side of the upper eWriter substrate 62 on a side closer to the user. The eWriter lower substrate 65 typically has a light absorbing coating that allows for contrast in the written eWriter and prevents visibility of what is below the eWriter. This eWriter lower substrate can be a dyed film where the absorption comes from the dye imbibed in the polymeric substrate. Between the electrodes 14 is disposed a dispersion layer 66 including a dispersion of cholesteric liquid crystal (ChLC) material and polymer with spacers that allow for images to be written on the Advanced eWriter.

Under the Advanced eWriter 80 is the Advanced resistive Digitizer 60, which has Y output data represented by numeral 180 allowing for electrical signals to determine location along the Y axis of the device to be transmitted and X output data represented by numeral 170 allowing for electrical signals to determine location along the X axis of the device to be transmitted. Sensing the Y output data while driving the X output data provides electrical signals indicating the location of a simple Plastic Stylus 83 in the X direction, while sensing the X output data while driving the Y output data provides electrical signals indicating the location of a simple Plastic Stylus 83 in the Y direction. The non-dedicated, simple Plastic Stylus 83 does not contain any electronics and does not need to leave writing material on a writing surface W (e.g., no ink is deposited). The simple Plastic Stylus 83 is used to apply writing pressure to an outer writing surface W of the eWriter system so as to write on both the Advanced eWriter and the Advanced resistive Digitizer. The writing surface W can be formed by the eWriter upper substrate or by a coating applied to the eWriter upper substrate. The writing surface W is closer to the user than other components of the device, for example, the liquid crystal layer, are to the user. The user holds the stylus 83 or uses a fingernail on the writing surface W.

In one aspect of the liquid crystal eWriter system 70 a semitransparent eWriter lower substrate 65 is used, as show in FIG. 2B. This design may include an optical coupling layer in the gap shown between the Advanced eWriter and Advanced resistive Digitizer. In addition, there is a traceable image 71 below the liquid crystal eWriter system 70. The image 71 is referred to herein as a back pattern (e.g., ink image on a paper or polymeric template). As other examples, the back pattern can be removable and comprises at least one of: a template of a sports field, court or arena, a pattern for a children's game, an image for children to color, notepad lines, graph paper lines, or a menu of items that one can choose from. The back pattern can be formed by an emissive, backlit or reflective display device for displaying images. Another example is that the back pattern comprises a waveguide including light sources disposed at an edge thereof, and light emitting portions on a surface of the waveguide enabling light to leave the waveguide in a pattern. Further details and information about the semitransparent back layer and back patterns, and suitable ways to attach them to the eWriter, are described in U.S. patent application Ser. No. 14/678,482, which is incorporated herein by reference in its entirety. The eWriter need not include a back pattern and can be used to trace any object, for example, a person's hand below the device.

In one aspect of the liquid crystal eWriter system 70 the Advanced eWriter 80 is laminated to the Advanced resistive Digitizer 60 using pressure sensitive adhesive (PSA) as a coupling layer 81, as shown in FIG. 3. In another aspect the Advanced eWriter is disposed above and in contact with the Advanced resistive Digitizer without a material between them as shown in FIG. 2A. There is possible air between the resistive digitizer and eWriter represented by the optional gap between these components shown in FIG. 2A and FIG. 2B. Also, FIG. 2A and FIG. 2B cover the resistive digitizer and eWriter having no gap between them. The PSA can be 3M8212 or something similar that allows for attachment of the eWriter to the digitizer. In addition, liquid adhesive such as a two part epoxy system typically used in display assembly or a spray on adhesive such as 3M super 77, may be used for the adhesive coupling layer.

As in operation of the Typical cholesteric liquid crystal eWriter system, one writes or draws on the present liquid crystal eWriter system by applying localized pressure with an instrument. Unlike the case with the Typical eWriter system, however, in the present system the writing instrument can be anything, including a non-specialized stylus, a fingernail or other object, and has palm rejection. The writing instrument does not include ink or lead and does not leave physical material on the writing surface. The application of pressure results in a change of reflectance of the cholesteric liquid crystal material. For example, in one mode known as Mode B, the cholesteric liquid crystal material is initially in the substantially transparent or focal conic texture (showing the light absorbing back layer, semitransparent back layer and any back pattern as discussed below); and then when the pressure is applied to the writing surface, this depresses the upper eWriter substrate causing the liquid crystal to flow and its texture to change to the reflective planar texture in the vicinity of the stylus. So, applying pressure with the stylus along a line instantly forms an image of a brilliant color line that is contrasted, for example, to a black background formed by a dark light absorbing back layer or to a background formed by a semitransparent back layer and any back pattern. The system includes a bistable cholesteric liquid crystal dispersion layer 66 in which both the planar and focal conic textures are stable and remain indefinitely without application of an electric field to form or maintain the image.

The Advanced resistive Digitizer shown in FIG. 4 in side view and FIG. 5 in top perspective view, is a 4-wire resistive digitizer that includes a thin upper polymeric digitizer substrate 160 and a lower polymeric digitizer substrate 90. The upper digitizer substrate has a top sensing electrode 150 that covers the active and recordable area of the Digitizer with bus bars 195 that run along opposite sides (FIG. 5). The thin upper digitizer substrate 160 is flexible and allows for improved writing response from the liquid crystal eWriter system, in that it allows for better palm rejection and less missing of light strokes. Also it has patterned electrically conductive traces 190 that connect the top sensing electrode 150 to the X output data 170 allowing for electrical signals for the X axis of the device to be transmitted. The patterned electronic traces 190 can be achieved by printing conductive carbon, silver, or other conductive material with a resistance low enough that allows for the electronic traces to transmit data with a clean signal. The lower digitizer substrate has a bottom sensing electrode 100 that covers the active and recordable area of the Advanced resistive Digitizer with bus bars 195' that run along opposite sides and are perpendicular to bus bars 195. Also it has patterned electrically conductive traces 190' that connect the bottom sensing electrode 100 to the Y output data 180 allowing for electrical signals for the Y axis of the device to be transmitted. In addition, there are patterned dielectric layers 130 to prevent shorting of the top and bottom conductors to the patterned electronic traces 190. Patterned digitizer spacers 140 keep the top and bottom sensing electrodes apart when the Advanced resistive Digitizer is not being written on to prevent unwanted writing on the Advanced resistive Digitizer. In addition, the patterned digitizer spacer height and the digitizer spacer diameter (relative to a top view of the digitizer spacers), and the distance between the digitizer spacers, are tailored to contribute to the ability to record image data from writing on the upper Advanced eWriter, without loss of light strokes and without capturing palm input. The upper and lower digitizer substrates are held together by patterned adhesive 110. In FIG. 4 the top sensing electrode 150 and the bottom sensing electrode 100 are patterned.

The top sensing electrode and bottom sensing electrode can be either patterned or unpatterned. In the event the top and bottom sensing electrodes are unpatterned, additional patterned dielectric layers 130 may be used to electrically isolate the top sensing electrode and bottom sensing electrode from the patterned electronic traces 190 as shown in FIGS. 6A and 6B. There are multiple coatings of patterned dielectric layers 130.

The primary mechanism in the operation of the Advanced resistive Digitizer is the initiating of physical contact between the top sensing electrode and the bottom sensing electrode, which allows the controller to take position measurements. When pressure is applied by a stylus to the eWriter system writing surface the stylus pressure is physically transmitted through the Advanced eWriter to the upper digitizer substrate. The x, y position of the stylus is identified by applying a voltage across one of the sensing electrodes and then measuring the voltage output from the other sensing electrode, thus creating a voltage divider. The actual location is found from the ratio of the measured voltage to the drive voltage applied times the height or width of the digitizer, depending on whether the X or Y coordinate is being measured. Neal Brenner, Shawn Sullivan, "4-Wire and 8-Wire Resistive Touch-Screen Controller Using the MSP430™," Texas Instruments Application Report SLAA384A, February 2008, which is incorporated by reference. This is how a typical 4-Wire resistive digitizer works. However, in a particular aspect of the disclosed liquid crystal eWriter system, the Advanced resistive Digitizer has been designed to work properly only when the Advanced eWriter is above the Advanced resistive Digitizer. In addition, the Advanced resistive Digitizer will not record pressure from a finger or palm with typical hand resting force during stylus writing on the writing surface of the liquid crystal eWriter system. The liquid crystal eWriter system of the disclosure has also been designed to respond to light stylus writing so that when a user writes on the writing surface of the Advanced eWriter with a light stylus force and sees an optical response on the eWriter the Advanced resistive Digitizer will also enable a recorded digital image with little to no stroke loss. One unexpected result of the eWriter system of this disclosure is that despite the fact that a force applied by a user's palm while writing with a stylus or fingernail will not record data from the palm, the light stylus writing will produce an optical response on the eWriter and it will be recorded by the Advanced resistive Digitizer with little to no stroke loss. The force required to move the top digitizer substrate so that the upper electrode 150 comes into contact with the lower electrode 100 while the Advanced resistive Digitizer is beneath the Advanced eWriter, also called activation force, is dependent on design parameters selected from the group consisting of: digitizer upper substrate thickness, digitizer substrate material, digitizer spacer dot material, digitizer spacer dot spacing, digitizer spacer dot material, digitizer spacer dot height (from a side view), digitizer spacer dot diameter (from a top view), eWriter upper substrate thickness, eWriter lower substrate thickness, eWriter substrate material, and combinations thereof. In applications such as note taking on the liquid crystal eWriter system, these parameters are balanced so that a pointed utensil such as a stylus will activate the Advanced resistive Digitizer under typical writing conditions, while at the same time, are robust enough to prevent blunt objects such as a palm or knuckle from activating the digitizer.

The minimum stylus activation force that can be recorded by the liquid crystal eWriter system will define how lightly a user can write on the device without stroke loss. When users, engaged in typical writing practices, write a sentence with interior letters that have curvature, such as an "e", "c" or "o", among others, they tend to write lightly. This and other light writing must be captured and the minimum stylus activation force tailored to ensure that there is substantially no light stroke loss and, in particular, no light stroke loss for strokes that can be viewed on the eWriter. It is desirable for the device to record all stylus written data. However, if the Advanced resistive Digitizer records stylus activation forces down to 0N then there will be no solution for palm rejection. In addition, the eWriter does not have an optical response to lines written with an extremely light stylus activation force so there is no benefit having a digitizer that can record data all the way to 0N. Activation force is used as a measurement to quantify how much force is being applied to a digitizer with a particular stylus tip. This is simply a measurement of when one digitizer sensing electrode initially begins to come in contact with the opposing sensing conductor by applying a voltage across one sensing conductor and then identifying the force required to measure a non-zero voltage on the opposing sensing conductor. To understand the forces applied by the typical person when writing notes, several people's writing was evaluated for missing strokes (referred to herein as "typical writing practices") and then compared with the measured activation force of each digitizer used by the test group. After evaluating typical population writing samples, it was found that the lightest that people tend to write is between 0.1N and 0.4N (using a 0.8 mm diameter Polyoxymethylene (POM) stylus tip). To one of ordinary skill in the art it is known that other diameter stylus tips or other stylus tip materials can be used to benchmark these systems and will simply result in a slight shifting of the desired activation force ranges. As used in this disclosure, the term Stylus Activation Force is taken with regard to a reference POM stylus tip of 0.8 mm diameter and the term Palm Activation Force discussed below, is taken with regard to a reference palm simulator that includes a silicone tip of 16 mm diameter. The stylus continues to bring the two digitizer sensing electrodes in contact (thus resulting in the stylus' xy location and a saved electronic image of the stylus written image) at forces greater than the Stylus activation force. The minimum Stylus Activation Force simply refers to the lowest forces that the Digitizer can read and it is known that the Digitizer continues to read forces created by the stylus at values greater than the minimum Stylus Activation Force. The liquid crystal eWriter systems of this disclosure were created to have a minimum Stylus Activation Force between 0.02N and 0.4 N (using a reference stylus tip of 0.8 mm diameter using a POM stylus). Polyoxymethylene (POM) also known as acetal, polyacetal and polyformaldehyde, is an engineering thermoplastic. It has been sold as DELRIN™ thermoplastic from DuPont and CELCON™ thermoplastic from Celanese Corporation, for example. For this disclosure the POM tip consisted of the DELRIN™ thermoplastic material from Dupont. The claims are not limited to using such a stylus type, stylus tip diameter or stylus tip material, or such a palm simulator diameter or tip material, but the reference stylus and palm simulator diameters are identified to permit the claimed activation force to be understood. The reference stylus POM tip of 0.8 mm diameter is the measurement system used to repeatably measure the minimum Stylus Activation Force. Other styluses and stylus tip diameters will achieve different stylus activation forces that will still fall within the scope of the claimed invention so long as the stylus activation force range and the palm activation force range using the reference stylus diameter and reference palm simulator diameter, respectively, are satisfied. As different materials and processes are used to create the different components (such as sensing electrode, patterned electronic traces, and spacers) of the Advanced resistive Digitizer the specific parameters of the liquid crystal eWriter system may change to meet the desired minimum stylus activation force described above. For example, the Advanced resistive Digitizer spacer height, diameter, and distance between spacers, along with the resistance and trace widths may be adjusted to meet the needed minimum stylus activation force.

As seen in FIG. 7, two different liquid crystal eWriter system sets were used in which the same eWriter was used for all data points and the Advanced resistive Digitizer of each Materials set only varied by changing the distance between the digitizer spacers (X axis). Materials set 1 used a dielectric material for spacers, a different dielectric material for the adhesive border, silver bus bars and indium tin-oxide (ITO) sensing electrodes as described in Example 1. Also in Materials set 1 the Digitizer top substrate was 1 mil PET with a PSA holding the eWriter to the digitizer. For Materials set 2 different dielectric material than what was used for Materials set 1 was used for spacers, a different dielectric material was used for the adhesive border, a different material was used for the silver bus bars and the sensing electrodes were made from PEDOT/PSS as described in Example 2. For Materials set 2 the digitizer top substrate is 2 mil PET and there is no PSA connecting the eWriter to the digitizer.

A Minimum Stylus Activation Force was measured for each liquid crystal eWriter system. The Advanced eWriter that was used for this measurement was designed to work with the Advanced resistive Digitizer by decreasing the total eWriter substrate thickness (to 4 mil) and using a smooth opaque thin lower eWriter substrate as the only light absorbing layer of the eWriter system. As can be seen in FIG. 7, liquid crystal eWriter System set 1 fits the desired Minimum Stylus Activation Force range designated by shaded area 200, 0.02N to 0.2N, for all digitizer spacer spacing distances. However, some designs in liquid crystal eWriter system set 2 fall into the suitable Minimum Stylus Activation force range designated by shaded area 210, 0.2N to 0.4N at certain digitizer spacer spacing distances. The desired Minimum Stylus Activation Force can be used to describe the liquid crystal eWriter system. One of ordinary skill in view of this disclosure will realize how to adapt the physical design parameters of the system described in this disclosure, including the Advanced resistive Digitizer spacer distribution, to achieve the desired Minimum Stylus Activation Force range. In the desired Minimum Stylus Activation Force range 200 there are little to no missing strokes when the liquid crystal eWriter system with the Advanced resistive Digitizer is written on with light strokes. In the suitable Minimum Stylus Activation Force range 210 there are a small amount of missing strokes when the liquid crystal eWriter system with the Advanced resistive Digitizer is written on with light strokes (e.g., the data points of Material set 2 outside of Minimum Stylus Activation Force range 210).

When engaged in ordinary writing conditions people tend to place the palm of the writing hand on the device or surface that they are writing on if there is sufficient space for the palm. This palm force can cause a typical resistive Digitizer to allow the top sensing electrode to come in contact with the bottom sensing electrode. When the sensing electrodes unintentionally touch each other due to the palm force, this records a data point from the palm which corrupts stylus data or registers a false touch. Currently available resistive Digitizers lack suitable palm rejection under ordinary writing conditions. In other words, they undesirably register data points from resting a palm on them.

The palm activation force that is recorded by the liquid crystal eWriter system with resistive Digitizer of this disclosure enables determining how much pressure a user's hand can place on the device without contacting the top sensing electrode and the bottom sensing electrode together. After evaluating typical population writing samples, it was found that the typical Palm Activation Force that people tend to apply with their palm while writing is between 2.5N to 4N (for a palm simulated by a 16 mm diameter silicone rubber tip). Some users could place a larger amount of force on their palm while writing. Therefore, a higher palm activation force of the eWriter system is more desirable. For the palm simulator we used silicone rubber, in particular, a ⅝" (16 mm) diameter, 60A durometer, high-temperature silicone rubber ball from McMaster-Carr. To one of ordinary skill in the art it will be apparent in reading this disclosure that other diameter stylus tips or other stylus tip materials can be used to benchmark these systems and will simply result in a slight shifting of the desired activation force ranges. The reference palm simulator that includes a silicone tip of 16 mm diameter is the measurement system used to repeatably measure the Palm Activation Force. The liquid crystal eWriter system with Advanced resistive Digitizer of this disclosure will have suitable palm rejection if it has a Palm Activation Force of between 2.5N and 4N (using a 16 mm diameter silicone rubber tip simulating a palm); and in particular, excellent palm rejection if it has a palm activation force of at least 4N (using a 16 mm diameter silicone rubber tip simulating a palm).

As seen in FIG. 8, the same two liquid crystal eWriter system sets of FIG. 7 were used, where the same eWriter was used for all data points measured and the Digitizer of each Materials set only varied by changing the distance between the digitizer spacers. The distance between the digitizer spacers was varied on the X axis of the graph and the Palm Activation Force was measured for each liquid crystal eWriter system of a set on the Y axis of the graph. The eWriter was designed to work with the Advanced resistive Digitizer by decreasing the total eWriter substrate thickness and using a smooth, thin, opaque bottom substrate. As can be seen in FIG. 8, the liquid crystal eWriter system set 1 does not fit the desired Suitable Palm Activation Force Range represented by shaded region 230, 2.5N to 4N, for all digitizer spacer spacing distances. However, at the 0.3 mm digitizer spacer spacing is a solution for the liquid crystal eWriter system of set 1 as it does fall into the more desirable Excellent Palm Activation Force range represented by shaded region 220, ≥4N. For liquid crystal eWriter materials set 2 all digitizer spacer spacing distances fall into the Excellent Palm Activation Force range 220.

When comparing the results of FIG. 8 with the results from FIG. 7 it is expected that each liquid crystal eWriter system will have multiple digitizer spacer spacing distances that will satisfy both the desired Minimum Stylus Activation Force range 200 and at least the desired Suitable Palm Activation Force range 230 or better in the desired Palm Activation Force range 220. For liquid crystal eWriter system materials set 1 these overlapping forces are expected to occur at digitizer spacer spacing distances that range from about 0.25 to 0.35 mm. For liquid crystal eWriter system materials set 2 these overlapping forces occur for the Suitable Minimum Stylus Activation Force range 210 and the Desirable Palm Activation Force range 230 and are expected to occur at digitizer spacer spacing distances that range from about 0.57-0.7 mm.

In all activation force measurements the Advanced eWriter is placed on top of the Advanced resistive Digitizer relative to the vantage point of the user and the activation force of the digitizer is measured by coming in contact with the top substrate of the eWriter. The measurement is done with the eWriter above the digitizer because any change in the thickness of the material above the Advanced resistive Digitizer will change the measured activation force. In addition, the eWriter is designed to have thinner top and/or bottom substrates than the typical substrates used in eWriters. This is a significant change as thinner eWriter substrates present concerns of difficulty manufacturing in a continuous roll-to-roll process and potential uniformity variations in the eWriter. The thinner substrates allow for a liquid crystal eWriter system that is sensitive enough to read light writing but also allow for physically designed palm rejection. One approach for reducing thickness of the Advanced eWriter is to eliminate the separate light absorbing layer that is normally formed on the lower eWriter substrate. The lower substrate itself can be modified or selected to be a light absorbing layer (such as using black PET as a dark lower substrate), which can be the only light absorbing layer in the Advanced eWriter.

The variation in measured Minimum Stylus Activation Force and Palm Activation Force when the eWriter top and bottom substrate thicknesses are changed is shown using Materials set 1 in FIG. 9, where both the minimum stylus activation force measured and the palm activation force measured plots are shown. The liquid crystal eWriter systems shown FIG. 9 had a digitizer spacer spacing distance of 0.3 mm but had the different total eWriter substrate thicknesses shown. The minimum stylus activation force measured and the palm activation force measured plots each share the same liquid crystal eWriter system design for each value of total thickness of eWriter substrates shown. The thinner the eWriter top and bottom substrate thickness the lower the minimum stylus activation force measured and the more likely the liquid crystal eWriter system is to meet the desired Minimum Stylus Activation Force Range 200, 0.02N to 0.4N. However as can be seen in FIG. 9, as the minimum stylus activation force measured decreases so does the palm activation force measured. The successful design meets both the minimum Stylus activation force and the Palm activation force ranges. For FIG. 9 possible solutions are to have the eWriter total substrate thickness between 4 mil and 7 mil, with the preference to have the minimum Stylus activation force smaller so as to prevent possible stroke loss. Of course once the stylus begins activating the digitizer, where the top substrate of the digitizer comes in contact with the bottom substrate of the digitizer, than all activation forces greater than the minimum stylus activation force for that liquid crystal eWriter system will also cause the digitizer top substrate to come in contact with the bottom substrate. As shown, suitable liquid crystal eWriter system designs may be readily obtained by adjusting the design parameters described in this disclosure.

A general design block diagram of an example embodiment is shown in FIG. 10. It includes an Advanced eWriter 80, an Advanced resistive Digitizer 60, and associated electronic circuitry 700. The circuitry 700 includes a processor 705, a resistive touch controller 701, eWriter drive circuits 702, a battery 703, a memory storage device 704, a USB port IC 706, and a Bluetooth IC 707. The processor 705 may be a general purpose microcontroller such as a member of the MSP430 or Tiva families from Texas Instruments. The memory storage device 704 may be removable, such as by using a USB flash drive or other types of removable flash memory commonly used in the computer industry, such as compact flash, memory stick, MicroSD, MMC, etc., or an internal RAM, flash, or hard drive such as might be used in a laptop computer, for example. The Advanced resistive Digitizer 60 is integrated with the eWriter 80 as shown in FIG. 2. The resistive touch controller 701 may be, for instance, a device from the AR1000 series from Microchip. Alternatively, the functionality of the resistive touch controller 701 may be implemented within the processor 705 by implementing the methods in Neal Brenner, Shawn Sullivan, "4-Wire and 8-Wire Resistive Touch-Screen Controller Using the MSP430™," Texas Instruments Application Report SLAA384A, February 2008, which is incorporated herein by reference in its entirety. All writing and drawing on the Advanced eWriter 80 using a fingernail or stylus is sensed by the Advanced resistive Digitizer 60 and converted by the resistive touch controller 701 into coordinate data. The processor 705 is configured to execute software for storing image data representing the written or drawn image in the memory storage device 704. The image data may be comprised of the set of coordinate data received from the resistive touch controller 701 or an image in a standardized format, such as Portable Document Format (PDF) or Portable Network Graphics (PNG), obtained by converting the location of the pressure applied to the writing surface of the Advanced eWriter 80 (the coordinate data) into the specific format. The image data may be sent by single data point, or group of data points, or one complete capture, through USB 706 or Bluetooth IC 707 to an external device, such as PC, laptop, PDA or cell phone not shown in FIG. 10. The Bluetooth IC 707, for example, provides a data interface adapted to connect the liquid crystal eWriter system to an external device and also adapted to transmit the image data stored in the memory storage device to the external device for reproducing on the external device the image formed on the eWriter. Further information about suitable electronics of the eWriter system, especially for reproducing the image of the Advanced eWriter on an external device, can be found in U.S. patent application Ser. No. 12/787,843 entitled "Writing Tablet Information Recording Device," which is incorporated herein by reference in its entirety. The image on the eWriter 80 is erased by voltage pulses supplied by the drive circuit 702 as disclosed for example, in the U.S. Ser. No. 12/787,843 patent application.

A general design block diagram of another example embodiment is shown in FIG. 11. This embodiment contains all of the elements of the block diagram in FIG. 10 with the exception that the memory storage device 704 has been eliminated. In this lower cost embodiment, the eWriter system requires either a wired or wireless data connection to an external device in order to function. The processor 705 has limited memory resources for buffering coordinate data from the resistive touch controller 701 and must transmit coordinate data to the external device over the wired or wireless data connection in real-time or near real-time in order to prevent data loss. The external device may be used to display the image as it is being created from the coordinate data or store the image for later viewing.

The concept of the liquid crystal eWriter system with Advanced resistive Digitizer and having palm rejection is illustrated in FIG. 12. One of ordinary skill in the art will understand that FIG. 12 is presented to illustrate general concepts and should not be applied to limit the claimed invention in any way. Prior to this figure only the Activation Force applied to the Advanced resistive Digitizer has been discussed. It is well known in the art that it is difficult to quantify the contact area of the stylus tip and the palm, so the touchscreen industry tends to focus on activation force. To consider the pressure applied one must consider the contact area since pressure is equal to force divided by area. Even though the activation force applied by the palm may be higher than that of the stylus this is mainly due to the large area difference between a palm and a stylus. If the pressure difference is considered instead, then the typical palm pressure 710 will be less than the minimum activation pressure 715 of the liquid crystal eWriter system of this disclosure. In addition, the typical stylus pressure 720 will be above the minimum pressure required to activate the liquid crystal eWriter system.

The present disclosure will now be described by way of examples which are for explanatory purposes and should not be used to limit the invention as defined by the claims.

Example 1

A liquid crystal eWriter system including an Advanced resistive Digitizer with palm rejection was constructed using materials set 1. The size of the eWriter system's writing surface was 5.5 inch diagonal. An Advanced eWriter was coupled to a 4-wire Advanced resistive Digitizer using a 1 mil thick PSA layer between them with the eWriter disposed above the Advanced resistive Digitizer relative to the vantage point of the user. The Advanced eWriter was built using typical eWriter materials including materials of a cholesteric liquid crystal and polymer dispersion and other device components as demonstrated in prior art U.S. Pat. Nos. 8,228,301 and 8,139,039, except for the eWriter substrate thickness, opacity and the cell gap or distance between electrodes. The Advanced eWriter included an upper optically clear, flexible polymeric eWriter substrate, a second black dyed, flexible polymeric lower eWriter substrate and an active layer disposed between the eWriter substrates. The top and bottom eWriter substrates were made from 2 mil thick Polyethylene Terephthalate (PET) that was flood coated with a PEDOT based conducting polymer (CP), which was unpatterned and covered substantially the entire area of the substrates. The bottom substrate was a black dyed PET. The active layer or dispersion layer included a dispersion of green (550 nm) cholesteric liquid crystal and polymer. The active layer of the Advanced eWriter was made from a blend of polymerizable monomer, crosslinker, photointiator, nonpolymerizable cholesteric liquid crystal and eWriter spacers. The dispersion was phase separated into an open celled cholesteric liquid crystal/polymer structure in which the liquid crystal can flow when pressure is applied without damaging the polymer structure. The chemistry of the dispersion was similar to that in U.S. Pat. No. 8,228,301. The eWriter spacer size was 2 um.

A resistive Digitizer was procured from a resistive digitizer manufacturer and had an upper substrate made of PET with a thickness of 1 mil with ITO coated on the underside. The lower digitizer substrate was made of PET with a thickness of 5 mil and had ITO coated on the top side. The lower digitizer substrate was laminated to a 0.7 mm thick rigid backer using a 1 mil PSA. Silver bus bars were printed on each substrate so that the electric field across each substrate was uniformly distributed perpendicular to the opposing substrate. On the lower digitizer substrate, digitizer spacer dots of 100-110 µm diameter and 7-10 µm height were printed in a square array with each digitizer spacer being 0.3 mm apart from another digitizer spacer (center-to-center). The square array pattern repeats to fill the entire active sensing area of the Advanced resistive Digitizer.

Activation force was measured by lowering an Imada ZP-11 Force Gauge with a stylus tip attached to the end at a rate of 0.3 in/min onto the writing surface of the eWriter with the Digitizer below the eWriter. A 0.8 mm diameter POM stylus tip was used for measuring the stylus activation force while a 16 mm diameter silicone rubber tip was used for the palm (knuckle). A data acquisition (DAQ) board was used to apply 5V across the upper and lower substrates of the digitizer and it read a voltage when the two substrates came into contact with each other. When a non-zero voltage was read by the DAQ board, the digitizer was considered activated and the corresponding force measurement was considered the activation force. Each digitizer was measured in five different locations and averaged.

Example 2

A Liquid crystal eWriter system including an Advanced resistive Digitizer with palm rejection was constructed using materials set 2. The size of the eWriter system writing surface was 5.5 inch diagonal. The Advanced eWriter was placed directly on top of a 4-wire Advanced resistive Digitizer relative to the vantage point of the user. The Advanced eWriter was built using typical eWriter materials including a dispersion of cholesteric liquid crystal material and polymer and other device components as demonstrated in prior art U.S. Pat. Nos. 8,228,301 and 8,139,039, except for the eWriter substrate thickness, opacity and the cell gap or distance between electrodes. The Advanced eWriter included an upper optically clear, flexible polymeric eWriter substrate, a lower black dyed, flexible polymeric eWriter substrate and an active layer between the substrates. The top and bottom eWriter substrates were made from 2 mil thick Polyethylene Terephthalate (PET) that was flood coated with a PEDOT based conducting polymer (CP), which was unpatterned and covered substantially the entire area of the substrates. The bottom substrate was a black dyed PET. The active layer or dispersion layer included a dispersion of green (550 nm) cholesteric liquid crystal and polymer. The active layer of the eWriter included a blend of polymerizable monomer, crosslinker, photointiator, nonpolymerizable cholesteric liquid crystal and eWriter spacers. The dispersion was phase separated into an open celled cholesteric liquid crystal polymer structure in which the liquid crystal could flow when pressure was applied without damaging the polymer structure. The chemistry of the dispersion was similar to that in U.S. Pat. No. 8,228,301. The eWriter spacer size was 2 um.

The Advanced resistive Digitizer had an upper digitizer substrate that was made of PET with a thickness of 2 mil with AGFA Orgacon S300 PEDOT coated on the underside. The lower digitizer substrate was made of PET with a thickness of 7 mil and had PEDOT coated on the top side. Two layers of Henkel Electrodag 452SS Dielectric were screen printed on each digitizer substrate using a 200-count polyester mesh in order to isolate the non-sensing portion of the bus bars from the flood-coated PEDOT. Bus bars were screen printed with a 200-count polyester mesh screen from Printer's Edge on each substrate using Henkel Electrodag 461SS Silver so that the electric field across each substrate was uniformly distributed perpendicular to the opposing substrate. An additional layer of Henkel Electrodag 452SS was printed over the bus bars on each substrate for added protection. On the lower digitizer substrate, a 400-count stainless steel mesh screen from Sefar was used to screen print Norland UVS91 UV-curable resin to form digitizer spacer dots of 80-100 μm diameter and 7-10 μm height in a square array with each digitizer spacer being 0.5 mm apart from another digitizer spacer (center-to-center). The square array pattern repeated to fill the entire active sensing area of the Advanced resistive Digitizer. A perimeter of 3M SP-7555 UV-curable PSA was screen printed with a 200-count polyester mesh screen onto the upper digitizer substrate to adhere it to the lower digitizer substrate.

Activation force was measured by lowering an Imada ZP-11 Force Gauge with a stylus tip attached to the end at a rate of 0.3 in/min onto the writing surface of the eWriter with the Digitizer below the eWriter. A 0.8 mm diameter POM stylus tip was used for measuring the stylus activation force while a 16 mm diameter silicone rubber tip was used for the palm (knuckle). A data acquisition (DAQ) board was used to apply 5V across the upper and lower substrates of the digitizer and read a voltage when the two substrates came into contact with each other. When a non-zero voltage was read by the DAQ board, the digitizer was considered activated and the corresponding force measurement was considered the activation force. Each digitizer was measured in five different locations and averaged.

Many modifications and variations of the disclosed embodiments will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystal eWriter system with a resistive digitizer and having palm rejection, comprising:
an eWriter including eWriter substrates spaced apart from each other, an upper one of said eWriter substrates being formed of a flexible, optically clear polymeric material and a lower one of said eWriter substrates being formed of a flexible polymeric material, electrically conductive layers spaced apart from each other and located between said eWriter substrates, a dispersion layer including a dispersion of cholesteric liquid crystal material and polymer disposed between said electrically conductive layers, wherein pressure applied to said eWriter changes a reflectance of said cholesteric liquid crystal material forming an image; and
a resistive digitizer that determines a location of the pressure applied to said eWriter;
wherein said liquid crystal eWriter system is constructed and arranged such that said resistive digitizer detects fingernail or stylus input with substantially no lightly written stroke loss but detects substantially no palm input, under ordinary writing conditions.

2. The liquid crystal eWriter system of claim 1 including electronic circuitry for applying a voltage to said electrically conductive layers that erases the image.

3. The liquid crystal eWriter system of claim 1 wherein said resistive digitizer includes digitizer substrates that are spaced apart and polymeric spacers between said digitizer substrates, wherein the construction and arrangement of said liquid crystal eWriter system includes design parameters selected from the group consisting of: a thickness of the upper eWriter substrate, a thickness of the lower eWriter substrate, a thickness of an upper said digitizer substrate, a spacing between said digitizer spacers, a size of said digitizer spacers, a height of said digitizer spacers, and combinations thereof, that are tailored to enable said resistive digitizer to detect the fingernail or stylus input with substantially no lightly written stroke loss but to detect substantially no palm input, under ordinary writing conditions.

4. The liquid crystal eWriter system of claim 3 wherein a combined said thickness of said upper eWriter substrate and said thickness of said lower eWriter substrate ranges from 2-9 mils.

5. The liquid crystal eWriter system of claim 3 wherein said thickness of said upper digitizer substrate ranges from ½-3 mil.

6. The liquid crystal eWriter system of claim 3 wherein said spacing between said digitizer spacers ranges from 0.2-0.9 mm.

7. The liquid crystal eWriter system of claim 1 wherein a combined said thickness of said upper eWriter substrate and said thickness of said lower eWriter substrate ranges from 2-9 mils, said thickness of said upper digitizer substrate ranges from ½-3 mil and said spacing between said digitizer spacers ranges from 0.2-0.9 mm.

8. The liquid crystal eWriter system of claim 1 wherein said liquid crystal eWriter system includes a minimum Stylus Activation Force and a Palm Activation Force providing palm rejection, said minimum Stylus Activation Force being less than said Palm Activation Force.

9. The liquid crystal eWriter system of claim 1 wherein there is no palm input under ordinary writing conditions until said palm applies a force of at least 2.5 N.

10. The liquid crystal eWriter system of claim 1 wherein there is no palm input under ordinary writing conditions until said palm applies a force of at least 4.0 N.

11. The liquid crystal eWriter system of claim 1 wherein said resistive digitizer is disposed more distal from the user than said eWriter is from the user.

12. The liquid crystal eWriter system of claim 1 wherein said eWriter is disposed more distal from the user than said resistive digitizer is from the user.

13. The liquid crystal eWriter system of claim 1 comprising a coupling layer comprising adhesive disposed between said eWriter and said resistive digitizer.

14. The liquid crystal eWriter system of claim 13 wherein said adhesive includes at least one of pressure sensitive adhesive, liquid adhesive or spray adhesive.

15. A liquid crystal eWriter system with a resistive digitizer and having palm rejection, comprising:
an eWriter including a writing surface, eWriter substrates spaced apart from each other, an upper one of said eWriter substrates being formed of a flexible, clear polymeric material and a lower one of said eWriter substrates being formed of a flexible polymeric material, electrically conductive layers spaced apart from each other and located between said eWriter substrates, a dispersion layer including a dispersion of cholesteric liquid crystal material and polymer disposed between said electrically conductive layers, wherein pressure applied to said writing surface by a user changes a reflectance of said cholesteric liquid crystal material forming an image; and a resistive digitizer disposed more distal from the user than said eWriter is from the user, wherein said resistive digitizer determines a location of the pressure applied to said writing surface;

wherein said liquid crystal eWriter system includes a minimum Stylus Activation Force in the range of 0.02N to 0.4N and a Palm Activation Force that is ≥2.5N providing palm rejection.

16. The liquid crystal eWriter system of claim 15 including electronic circuitry for applying a voltage to said electrically conductive layers that erases the image.

17. The liquid crystal eWriter system of claim 15 wherein said resistive digitizer includes digitizer substrates that are spaced apart from each other and digitizer spacers between said digitizer substrates, wherein the construction and arrangement of said liquid crystal eWriter system includes design parameters selected from the group consisting of: a thickness of the upper eWriter substrate, a thickness of the lower eWriter substrate, a thickness of an upper said digitizer substrate, a spacing between said digitizer spacers, a size of said digitizer spacers, a height of said digitizer spacers, and combinations thereof, that are tailored to enable said resistive digitizer to achieve said Stylus Activation Force and said Palm Activation Force.

18. The liquid crystal eWriter system of claim 17 wherein a combined said thickness of said upper eWriter substrate and said thickness of said lower eWriter substrate ranges from 2-9 mils.

19. The liquid crystal eWriter system of claim 17 wherein said thickness of said upper digitizer substrate ranges from ½-3 mil.

20. The liquid crystal eWriter system of claim 17 wherein said spacing between said digitizer spacers ranges from 0.2-0.9 mm.

21. The liquid crystal eWriter system of claim 15 wherein a combined said thickness of said upper eWriter substrate and said thickness of said lower eWriter substrate ranges from 2-9 mils, said thickness of said upper digitizer substrate ranges from ½-3 mil and said spacing between said digitizer spacers ranges from 0.2-0.9 mm.

22. The liquid crystal eWriter system of claim 15 comprising a light absorbing back layer disposed below a lower one of said electrically conductive layers, said light absorbing back layer being adapted to absorb light that passes through said dispersion layer.

23. The liquid crystal eWriter system of claim 15 comprising a semitransparent back layer disposed below a lower one of said electrically conductive layers, wherein said semitransparent back layer absorbs light that passes through said dispersion layer, reflects grey light or light of a color and is light transmitting.

24. The liquid crystal eWriter system of claim 15 wherein said lower eWriter substrate is a light absorbing layer and is disposed below and in contact with a lower one of said electrically conductive layers, said lower eWriter substrate including pigment dispersed inside adapted to absorb light that passes through said dispersion layer.

25. The liquid crystal eWriter system of claim 15 wherein said Palm Activation Force is ≥4N.

26. The liquid crystal eWriter system of claim 15 wherein said Palm Activation Force is in the range of 2.5N to 4N.

27. The liquid crystal eWriter system of claim 15 comprising an adhesive coupling layer disposed between said eWriter and said resistive digitizer.

28. An optically clear liquid crystal eWriter system with a resistive digitizer and having palm rejection, comprising:
an eWriter including a writing surface, eWriter substrates spaced apart from each other, an upper one of said eWriter substrates being formed of a flexible, optically clear polymeric material and a lower one of said eWriter substrates being formed of a flexible, optically clear polymeric material, optically clear electrically conductive layers spaced apart from each other and located between said eWriter substrates, a dispersion layer including a dispersion of cholesteric liquid crystal material and polymer disposed between said electrically conductive layers, wherein pressure applied to said writing surface by a user changes a reflectance of said cholesteric liquid crystal material forming an image;

a semitransparent back layer disposed below a lower one of said electrically conductive layers, wherein said semitransparent back layer absorbs light that passes through said dispersion layer, reflects grey light or light of a color and is light transmitting; and an optically clear resistive digitizer that determines a location of the pressure applied to said writing surface;

wherein said liquid crystal eWriter system is constructed and arranged such that said resistive digitizer detects fingernail or stylus input with substantially no lightly written stroke loss but detects substantially no palm input, under ordinary writing conditions.

29. The optically clear liquid crystal eWriter system of claim 28 wherein all components of the eWriter system in a projected region orthogonal to and encompassing said writing surface are optically clear except for said semitransparent back layer.

30. The optically clear liquid crystal eWriter system of claim 28 wherein said resistive digitizer is disposed below said semitransparent back layer.

31. The optically clear liquid crystal eWriter system of claim 28 comprising an optically clear coupling layer comprising adhesive disposed between said eWriter and said resistive digitizer.

32. The optically clear liquid crystal eWriter system of claim 28 including electronic circuitry for applying a voltage to said electrically conductive layers that erases the image.

33. The optically clear liquid crystal eWriter system of claim 28 including a removable back pattern disposed below said semitransparent back layer, wherein said removable back pattern is visible through said writing surface, wherein said removable back pattern is selected from the group consisting of a template of a sports field, court or arena, a pattern for a children's game, an image for children to color, notepad lines, graph paper lines, or a menu of items that one can choose from.

34. A liquid crystal eWriter system with a resistive digitizer and having palm rejection, comprising:
a battery for powering said liquid crystal eWriter system;
a memory storage device included in said liquid crystal eWriter system;
an eWriter including a writing surface, eWriter substrates spaced apart from each other, an upper one of said eWriter substrates being formed of a flexible, clear polymeric material and a lower one of said eWriter substrates being formed of a flexible, polymeric material, electrically conductive layers spaced apart from each other and located between said eWriter substrates, a dispersion layer including a dispersion of cholesteric liquid crystal material and polymer disposed between said electrically conductive layers, wherein pressure applied to said writing surface by a user changes a reflectance of said cholesteric liquid crystal material forming an image;

a resistive digitizer disposed more distal from the user than said eWriter is from the user, wherein said resistive digitizer determines a location of the pressure applied to said writing surface; and a processor configured to execute software for converting said location of the pressure applied to said writing surface into image data and for storing said image data in said memory storage device;

wherein said liquid crystal eWriter system includes a Stylus Activation Force in the range of 0.02N to 0.4N and a Palm Activation Force that is ≥2.5N providing palm rejection.

35. The liquid crystal eWriter system of claim 34 comprising a data interface adapted to connect said liquid crystal eWriter system to an external device and also adapted to transmit said image data stored in said memory storage device to said external device for reproducing on said external device the image formed on said eWriter.

36. The liquid crystal eWriter system of claim 34 including electronic circuitry for applying a voltage to said electrically conductive layers that erases the image.

37. The liquid crystal eWriter system of claim 34 wherein a combined said thickness of said upper eWriter substrate and said thickness of said lower eWriter substrate ranges from 2-9 mils, said thickness of said upper digitizer substrate ranges from ½-3 mil and said spacing between said digitizer spacers ranges from 0.2-0.9 mm.

38. The liquid crystal eWriter system of claim 34 comprising a light absorbing back layer disposed below a lower one of said electrically conductive layers, said light absorbing back layer being adapted to absorb light that passes through said dispersion layer.

39. The liquid crystal eWriter system of claim 34 comprising a semitransparent back layer disposed below a lower one of said electrically conductive layers, wherein said semitransparent back layer absorbs light that passes through said dispersion layer, reflects grey light or light of a color and is light transmitting.

40. The liquid crystal eWriter system of claim 34 wherein said lower eWriter substrate is a light absorbing layer and is disposed below a lower one of said electrically conductive layers, said lower eWriter substrate including pigment dispersed inside adapted to absorb light that passes through said dispersion layer.

41. The liquid crystal eWriter system of claim 34 wherein said Palm Activation Force is ≥4N.

42. The liquid crystal eWriter system of claim 34 wherein said Palm Activation Force is in the range of 2.5N to 4N.

43. A liquid crystal eWriter system with a resistive digitizer and having palm rejection and providing streaming data, comprising:

a battery for powering said liquid crystal eWriter system;

an eWriter including a writing surface, eWriter substrates spaced apart from each other, an upper one of said eWriter substrates being formed of a flexible, optically clear polymeric material and a lower one of said eWriter substrates being formed of a flexible polymeric material, electrically conductive layers spaced apart from each other and located between said eWriter substrates, a dispersion layer including a dispersion of cholesteric liquid crystal material and polymer disposed between said electrically conductive layers, wherein pressure applied to said writing surface by a user changes a reflectance of said cholesteric liquid crystal material forming an image;

a resistive digitizer disposed more distal from the user than said eWriter is from the user, wherein said resistive digitizer determines a location of the pressure applied to said writing surface;

a data interface adapted to connect said liquid crystal eWriter system to an external device and also adapted to transmit data to said external device;

a processor configured to execute software for converting said location of the pressure applied to said writing surface into coordinate data and to stream said coordinate data over said data interface to said external device in real time or near real time for reproducing on said external device the image formed on said eWriter;

wherein said liquid crystal eWriter system includes a Stylus Activation Force in the range of 0.02N to 0.4N and a Palm Activation Force that is ≥2.5N providing palm rejection.

44. The liquid crystal eWriter system of claim 43 wherein a combined said thickness of said upper eWriter substrate and said thickness of said lower eWriter substrate ranges from 2-9 mils, said thickness of said upper digitizer substrate ranges from ½-3 mil and said spacing between said digitizer spacers ranges from 0.2-0.9 mm.

* * * * *